(12) United States Patent
Cho et al.

(10) Patent No.: US 10,346,120 B2
(45) Date of Patent: Jul. 9, 2019

(54) METHOD OF DISPLAYING IMAGE BY USING A PLURALITY OF DISPLAY APPARATUSES AND ELECTRONIC APPARATUS CONTROLLING A PLURALITY OF DISPLAY APPARATUSES

(71) Applicant: SAMSUNG ELECTRONICS CO., LTD., Suwon-si (KR)

(72) Inventors: Kyung-sun Cho, Seoul (KR); Sang-bae Park, Cheongju-si (KR); Jae-hoon Jeong, Suwon-si (KR); Seong-seol Hong, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 40 days.

(21) Appl. No.: 14/684,750

(22) Filed: Apr. 13, 2015

(65) Prior Publication Data

US 2015/0293740 A1 Oct. 15, 2015

(30) Foreign Application Priority Data

Apr. 11, 2014 (KR) ........................ 10-2014-0043748

(51) Int. Cl.
*G06F 3/14* (2006.01)
*H04N 5/44* (2011.01)
*H04N 21/41* (2011.01)
*H04N 21/422* (2011.01)
*H04N 21/431* (2011.01)
(Continued)

(52) U.S. Cl.
CPC ......... *G06F 3/1446* (2013.01); *H04N 5/4403* (2013.01); *H04N 5/45* (2013.01); *H04N 21/4122* (2013.01); *H04N 21/42215* (2013.01); *H04N 21/431* (2013.01); *G09G 5/00* (2013.01); *G09G 2340/04* (2013.01);
(Continued)

(58) Field of Classification Search
CPC .... G06F 3/1446; G06F 3/1423; G06F 3/1431; G06F 3/1438; H04N 5/45; G09G 2300/026
See application file for complete search history.

(56) References Cited

U.S. PATENT DOCUMENTS 5,130,800 A * 7/1992 Johnson ............... H04N 7/0122
348/556
5,452,012 A * 9/1995 Saitoh ................ H04N 5/44543
348/564

(Continued)

*Primary Examiner* — Dong Hui Liang
(74) *Attorney, Agent, or Firm* — Sughrue Mion, PLLC

(57) ABSTRACT

A method of displaying an image by using a plurality of display apparatuses and a display apparatus using the same are provided. The method includes controlling a first image to be divided into a plurality of first sub-images which correspond to a number of a plurality of display apparatuses and displaying the plurality of first sub-images, receiving a signal to change a first sub-image of the first image displayed on a first display apparatus to a second image, and in response to receiving the signal, controlling the second image to be displayed on the first display apparatus and controlling the first image to be re-divided into a plurality of second sub-images corresponding to a number of a group of plurality of display apparatuses among the plurality of display apparatuses and displaying the plurality of second sub-images on the group of the plurality of display apparatuses.

14 Claims, 24 Drawing Sheets

(51) Int. Cl.
*H04N 5/45* (2011.01)
*G09G 5/00* (2006.01)

(52) U.S. Cl.
CPC ..... *G09G 2340/12* (2013.01); *G09G 2340/14* (2013.01); *G09G 2370/20* (2013.01)

(56) References Cited

U.S. PATENT DOCUMENTS

| | | | |
|---|---|---|---|
| 2004/0027482 A1* | 2/2004 | Lee | H04N 9/12 348/383 |
| 2004/0239812 A1* | 12/2004 | Park | H04N 5/44591 348/588 |
| 2005/0117910 A1* | 6/2005 | Foote | H04B 10/116 398/106 |
| 2007/0024645 A1* | 2/2007 | Purcell | G06F 3/1431 345/634 |
| 2008/0126975 A1* | 5/2008 | Vassigh | G06F 3/04895 715/772 |
| 2012/0242893 A1* | 9/2012 | Akitomo | G06F 3/1446 348/441 |
| 2013/0278872 A1* | 10/2013 | Teller | G02B 3/0037 349/96 |
| 2014/0267908 A1* | 9/2014 | Hagenbuch | H04N 21/44027 348/552 |

\* cited by examiner

FIG. 4
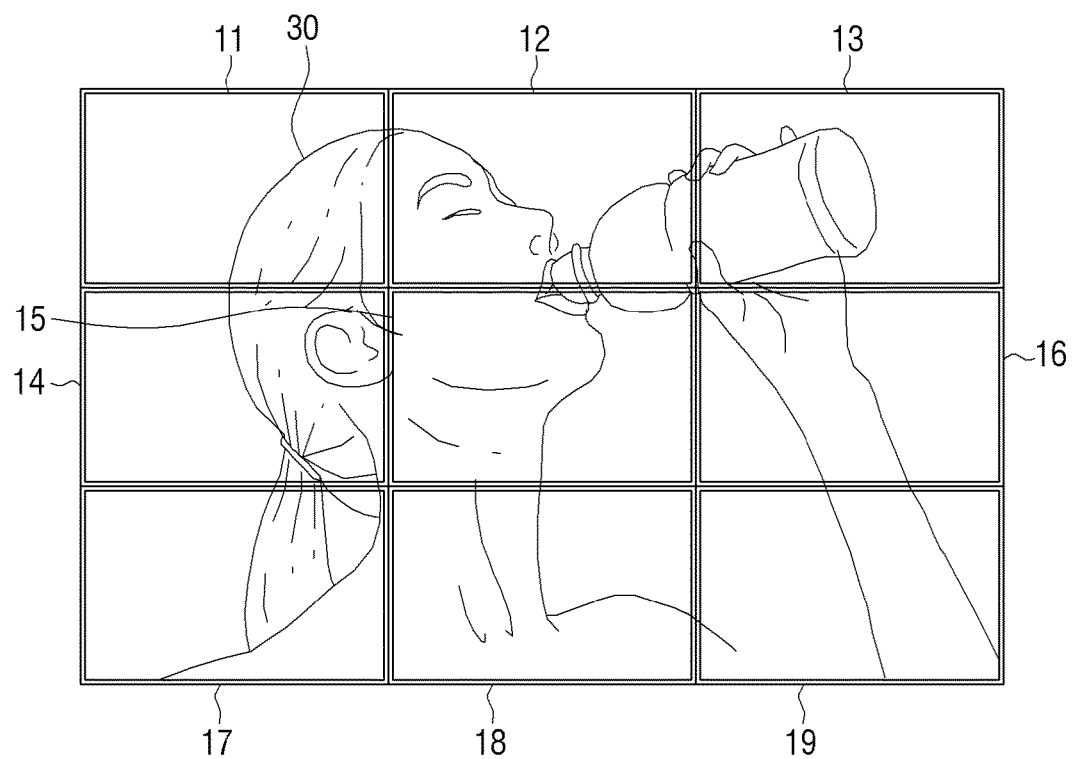
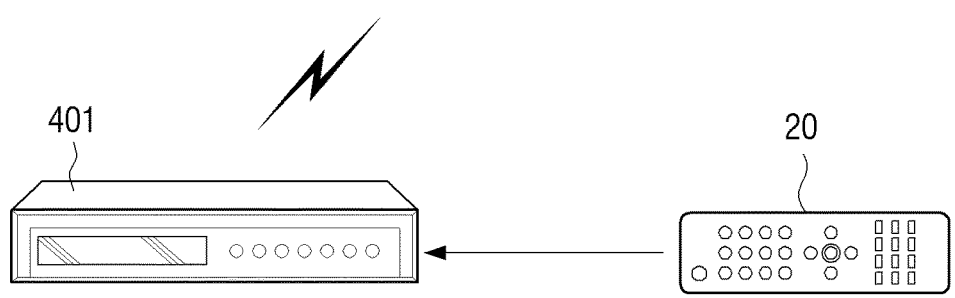

METHOD OF DISPLAYING IMAGE BY USING A PLURALITY OF DISPLAY APPARATUSES AND ELECTRONIC APPARATUS CONTROLLING A PLURALITY OF DISPLAY APPARATUSES

CROSS-REFERENCE TO RELATED APPLICATION

This application claims priority from Korean Patent Application No. 10-2014-0043748, filed on Apr. 11, 2014 in the Korean Intellectual Property Office, the disclosure of which is incorporated herein by-reference in its entirety.

BACKGROUND

1. Field

Methods and apparatuses consistent with exemplary embodiments relate to a method of displaying an image by using a plurality of display apparatuses and an electronic apparatus which controls a plurality of display apparatuses, and more particularly, to a method of dividing an image so that the image is displayed through a combination of a plurality of display apparatuses and displaying the divided images through a plurality of display apparatuses and an electronic apparatus which controls a plurality of display apparatuses for performing the method.

2. Description of the Related Art

With the popularization of a television (TV), which includes a display, an environment where an image is displayed on a plurality of TVs has increased. For example, a plurality of different images may be displayed through each of a plurality of TVs, or a single image may be displayed on a plurality of TVs.

By displaying an image on several TVs, a user is able to make a large screen by using several inexpensive TVs, instead of using an expensive large-scale TV. A large screen formed by using a plurality of TVs makes the viewer feel immersed in whatever is being viewed and can make the program being viewed seem more impressive. In addition, the large screen formed of a plurality of TVs may be located in a public place and used for advertising.

SUMMARY

When a large screen is formed of a plurality of TVs, each of the plurality of TVs may have a user input unit which receives a remote controller signal. In this case, a TV which a user does not want to manipulate may receive the remote controller signal and be controlled due to a user manipulation with respect to a remote controller.

In addition, a user may wish to selectively manipulate a large screen formed of a plurality of TVs or respective screens included in the plurality of TVs by using a remote controller.

In addition, in case of a plurality of TVs forming a large screen and displaying an image, the user may wish to be provided with a different image through at least one of the plurality of TVs. For example, the user may wish to be provided with a Picture in Picture (PIP) function or a Picture out Picture (POP) function which has been provided by an existing single TV through the plurality of TVs.

According to a method and an apparatus consistent with various exemplary embodiments, one TV among a plurality of TVs may be selectively controlled according to a user manipulation of a remote controller. In addition, according to the user manipulation with respect to the remote controller, a large screen or a respective screen may be controlled selectively. In addition, at least one TV among the plurality of TVs may display a different image while a single image is displayed through the plurality of TVs. Other problems which are obvious to a person having ordinary skill in the art may be resolved in light of the exemplary embodiments.

According to an aspect of an exemplary embodiment, there is provided a method of displaying an image by using a plurality of display apparatuses, the method including controlling a first image to be divided into a plurality of first sub-images which corresponds to a number of a plurality of display apparatuses and displaying the plurality of first sub-images on the plurality of display apparatuses, receiving a signal to change a first sub-image of the first image displayed on a first display apparatus among the plurality of display apparatuses to a second image, and in response to receiving the signal, controlling the second image to be displayed on the first display apparatus and controlling the first image to be re-divided into a plurality of second sub-images which correspond to a number of a group of the plurality of display apparatuses among the plurality of display apparatuses and displaying the plurality of second sub-images on the group of the plurality of display apparatuses. In addition, the group of the plurality of display apparatuses do not include the first display apparatus.

The method may further include selectively performing a first mode for controlling the re-divided first image to be displayed on the group of the plurality of display apparatuses, and a second mode for, in response to receiving the signal, controlling the first image before re-division of the first image to be continuously displayed on the group of the plurality of displays apparatuses, and controlling the second image to be displayed on the first display apparatus.

The method may further include, in response to displaying the first image being on the plurality of display apparatuses which forms a large screen, changing a brightness or a color of a bezel of the plurality of display apparatuses which corresponds to an edge of the large screen, and in response to displaying the second image on the first display apparatus, changing the brightness or the color of a bezel of the first display apparatus.

The receiving the signal to change the first sub-image of the plurality of first sub-images of the first image to the second image may include receiving a user input signal of pressing a button of a remote controller above a predetermined time, and the remote controller is located external to the plurality of display apparatuses.

In addition, the method may include receiving a user input signal of pressing a button of a remote controller within a predetermined time while the first image is divided into the plurality of first sub-images which corresponds to the number of the plurality of display apparatuses and the plurality of first sub-images are displayed on the plurality of display apparatuses, and in response to receiving the user input signal, controlling the second image, which is different from the first image, to be divided into the plurality of second sub-images which corresponds to the number of the plurality of display apparatuses and displaying the plurality of second sub-images on the plurality of display apparatuses.

The method may further include identifying the first display apparatus from among the plurality of display apparatuses. In addition, the identifying the first display apparatus may include identifying the first display apparatus based on information which represents that a remote controller, which external to the plurality of display apparatuses, tilts or moves in a direction of the first display apparatus.

The method may further include controlling one of an application, a channel information, or an advertisement information to be displayed on at least one display apparatus of the plurality of display apparatuses other than the group of the plurality of display apparatuses and the first display apparatus among the plurality of display apparatuses.

The selectively performing the first mode and the second mode may include selectively performing either of the first mode and the second mode by considering at least one of the number of the plurality of display apparatuses and an arrangement of the plurality of display apparatuses.

According to an aspect of another exemplary embodiment, there is provided a method of displaying an image by using a plurality of display apparatuses, the method including controlling a first image to be divided into a plurality of first sub-images which corresponds to a number of a group of the plurality of display apparatuses and displaying the plurality of first sub-images on the group of the plurality of display apparatuses, receiving a signal to change a second image displayed on a first display apparatus other than the group of the plurality of display apparatuses to a sub-image of the plurality of first sub-images of the first image, and in response to receiving the signal to change the second image, controlling the first image to be re-divided into a plurality of second sub-images which corresponds to the number of the group of the plurality of display apparatuses and the first display apparatus and displaying the plurality of second sub-images on the group of the plurality of display apparatuses and the first display apparatus.

The group of the plurality of display apparatuses and the first display apparatus may be physically combined or located proximate to each other.

According to an aspect of still another exemplary embodiment, there is provided an electronic apparatus which displays an image by using a plurality of display apparatuses, the electronic apparatus including a user input unit configured to, while a first image is displayed on the plurality of display apparatuses, receive a signal to change a first sub-image of a plurality of first sub-images of the first image displayed on a first display apparatus among the plurality of display apparatuses to a second image and a controller configured to, in response to receiving the signal to change the first sub-image of the plurality of first sub-images of the first image, control the second image to be displayed on the first display apparatus and control the first image to be re-divided into a plurality of second sub-images which corresponds to a number of a group of plurality of display apparatuses except for the first display apparatus among the plurality of display apparatuses and display the plurality of second sub-images on the group of the plurality of display apparatuses.

The controller may selectively perform a first mode for controlling the re-divided first image to be displayed on the group of the plurality of display apparatuses and a second mode for, in response to receiving the signal to change the first sub-image of the plurality of first sub-images of the first image, controlling the first image before re-division of the first image to be continuously displayed on the group of plurality of display apparatuses and controlling the second image to be displayed on the first display apparatus.

In response to the first image being displayed on the plurality of display apparatuses which forms a large screen, the controller may change a brightness or a color of a bezel of the plurality of display apparatuses which corresponds to an edge of the large screen, and in response to the second image being displayed on the first display apparatus, change the brightness or the color of a bezel of the first display apparatus.

The user input unit may receive a user input signal of pressing a button of a remote controller above a predetermined time, wherein the remote controller is located external to the plurality of display apparatuses.

The user input unit may receive a user input signal of pressing a button of a remote controller above a predetermined time while the first image is divided into the first plurality of sub-images which corresponds to a number of the plurality of display apparatuses and displaying the plurality of first sub-images on the plurality of display apparatuses. In addition, in response to receiving the user input signal, the controller may control a second image, which is different from the first image, to be divided into the plurality of second sub-images which corresponds to the number of the plurality of display apparatuses and display the plurality of second sub-images on the plurality of display apparatuses.

In response to the first display apparatus being identified from among the plurality of display apparatuses, the controller may identify the first display apparatus based on information representing that the remote controller, which is located external to the plurality of display apparatuses, tilts or moves in a direction of the first display apparatus.

The controller may control one of an application, a channel information, or an advertisement information to be displayed on at least one display apparatus other than the group of the plurality of display apparatuses and the first display apparatus among the plurality of display apparatuses.

In response to the first mode and the second mode selectively being performed, the controller may selectively perform one of the first mode and the second mode by considering at least one of the number of the plurality of display apparatuses and an arrangement of the plurality of display apparatuses.

According to an aspect of still another exemplary embodiment, there is provided an electronic apparatus which displays an image by using a plurality of display apparatuses, the electronic apparatus including a user input unit configured to, while a first image is displayed on a group of the plurality of display apparatuses, receive a signal to change a second image displayed on the first display apparatus other than the group of the plurality of display apparatuses to a first sub-image of the first image and a controller configured to, in response to receiving the signal to change the second image displayed on the first display apparatus, control the first image to be re-divided into a second plurality of images which corresponds to a number of the group of plurality of display apparatuses and the first display apparatus and display the plurality of second sub-images on the group of the plurality of display apparatuses and the first display apparatus.

The plurality of display apparatuses and the first display apparatus may be physically combined or located proximate to each other.

BRIEF DESCRIPTION OF THE DRAWINGS

The above and/or other aspects will be more apparent by describing certain exemplary embodiments with reference to the accompanying drawings, in which:

FIG. 4 is a diagram illustrating a plurality of combined display apparatuses and an external apparatus controlling the same according to an exemplary embodiment;

DETAILED DESCRIPTION

Figure 1:
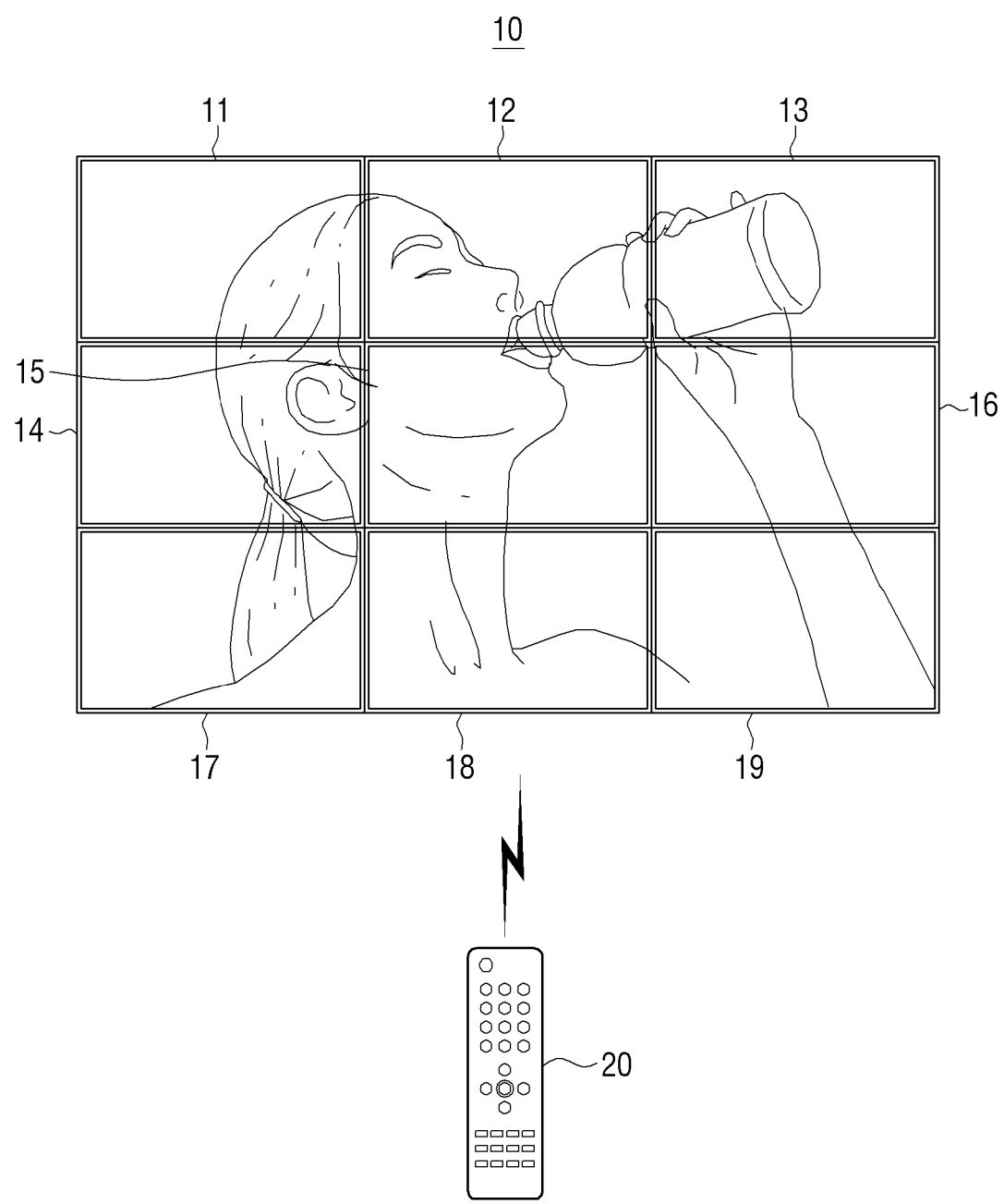
FIG. 1 is a diagram illustrating a system formed of a plurality of display apparatuses according to an exemplary embodiment.

Certain exemplary embodiments are described in greater detail below with reference to the accompanying drawings. In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

For the same reason, some components in the accompanying drawings are exaggerated, omitted, or schematically illustrated, and a size of each component does not fully reflect an actual size thereof. Accordingly, the exemplary embodiments are not limited by a relative size or distance illustrated in the accompanying drawings.

In addition, a singular form used in the exemplary embodiments is intended to include a plural form, unless specifically defined otherwise.

The terms 'unit' and 'module' in the present disclosure refer to a unit of processing at least one function or operation and thus may be embodied as hardware, software, or combination thereof.

Hereinafter, exemplary embodiments will be explained with reference to the accompanying drawings.

FIG. 1 is a diagram illustrating a system 10 formed of a plurality of display apparatuses according to an exemplary embodiment.

As shown in FIG. 1, the system 10 may include a first to ninth display apparatuses 11 to 19 and a remote controller 20.

In an exemplary embodiment, the first to ninth display apparatuses 11 to 19 are each embodied as a TV which displays a broadcasting image based on a broadcasting signal, broadcasting information, or broadcasting data received from transmitting equipment of a broadcasting station. However, a type of the images which may be displayed by the first to ninth display apparatuses 11 to 19 is not limited to a broadcasting image. For example, the first to ninth display apparatuses 11 to 19 may display an image such as, a moving image based on a signal or a data received from various types of image sources, a still image, an application, an On-Screen Display (OSD), a User Interface (UI) for controlling various operations, etc.

According to an exemplary embodiment, the first to ninth display apparatuses 11 to 19 may each be embodied as a smart TV. The smart TV may receive and display a broadcasting signal in real time. Further, the smart TV has a web browsing function and thus may search for and consume various types of content through the internet at the same time as displaying the broadcasting signal in real time. In addition, the smart TV may provide a convenient user environment for such operations. In the case of a smart TV including an open software platform and providing a user with a bi-directional service, the smart TV may provide the user with various contents, for example, an application providing a certain service, through the open software platform. The application refers to an application which provides various types of services. The application may include an application which provides a service such as a Social Network Service, finance, news, weather, map, music, movie, game, electronic books, etc.

A concept of the exemplary embodiments may be applied even when the first to ninth display apparatuses 11 to 19 are a wearable or portable device including a monitor, a mobile phone, an electronic picture frame, and a display connected to a main body of a computer.

Figure 2:
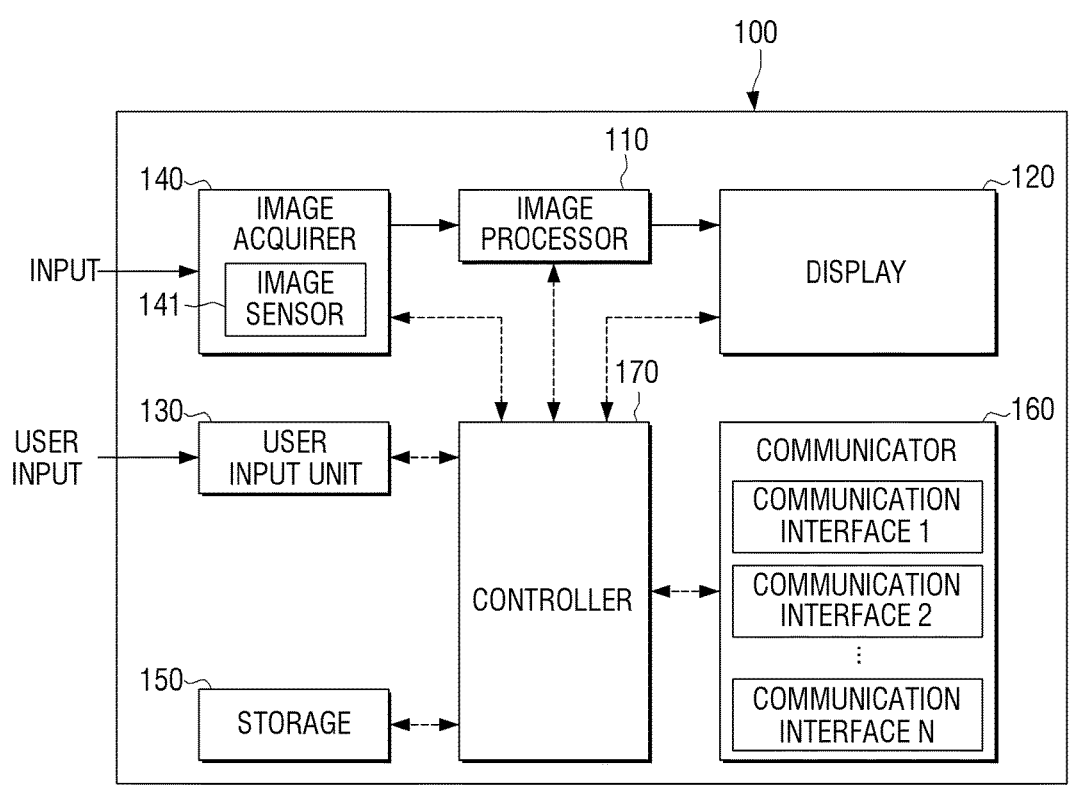
FIG. 2 is a block diagram illustrating a structure of an electronic apparatus according to an exemplary embodiment.

FIG. 2 is a block diagram illustrating a structure of an electronic apparatus 100 according to an exemplary embodiment. The structure of the electronic apparatus 100 shown in FIG. 2 may be applied to the first to ninth display apparatuses 11 to 19 in FIG. 1.

As shown in FIG. 2, the electronic apparatus 100 according to an exemplary embodiment may include an image processor 110 which processes an image signal received from an external source, a display 120 which displays the image signal processed by the image processor 110 as an image, a user input unit 130 which receives a user input, an image acquirer 140 which acquires an image from an external source, a storage 150 which stores various data, a communicator 160 which communicates with an external apparatus in a wired or wireless manner, and a controller 170 which controls the electronic apparatus 100.

The image processor 110 may perform various predetermined image processing operations with respect to an image signal. The image processor 110 may output the processed image signal on the display 120 so that an image is displayed on the display 120.

For such an image signal image processing operation, the image processor 110 may include an image receiver (not shown) which receives an image signal from an external source. In addition, the image processor 110 may be embodied in various ways which correspond to a standard of a received image signal and a form of the electronic apparatus 100. For example, the image processor 110 may receive a Radio Frequency (RF) signal transmitted from a broadcasting station (not shown) in a wireless manner or may receive an image signal according to composite video, component video, super video, Syndicat des Constructeurs d'Appareils Radiorécepteurs et Téléviseurs (SCART), High Definition Multimedia Interface (HDMI) standards, in a wired manner. When an image signal is a broadcasting signal, the image processor 110 may include a tuner which tunes the broadcasting signal according to a channel.

In addition, an image signal may be inputted from an external apparatus. For example, an image signal may be inputted from an external apparatus such as a Personal Computer (PC), an Audio-Video (AV) apparatus, a smart phone, a smart pad, etc. In addition, the image signal may be created by data received through a network such as the internet. In this case, the electronic apparatus 100 may perform network communication through the communicator 160. In addition, the image signal may be created by data stored in the non-volatile storage 150 such as a flash memory, a hard disk, etc. The storage 150 may be located inside or outside of the electronic apparatus 100. If the storage 150 is located outside of the electronic apparatus 100, the storage 150 may further include a connecter (not shown) to which the storage 150 is connected.

A type of the image processing operations performed by the image processor 110 is not limited to any particular type. For example, the image processing operations may include at least one of decoding, de-interlacing, frame refresh rate conversion, scaling, noise reduction for improving an image quality, detail enhancement, line scanning, etc., corresponding to various image formats. The image processor 110 may be embodied as a group of respective components which may perform such operations independently or may be embodied as a System-On-Chip (SOC) in which several functions are combined.

The display 120 displays an image based on the image signal processed by the image processor 110. The display 120 may be embodied, without limitation, as various types of displays such as liquid crystal, plasma, light-emitting diode, organic light-emitting diode, surface-conduction electron-emitter, carbon nano-tube, nano-crystal, etc.

According to an exemplary embodiment, the display 120 may further include additional components. For example, if the display 120 is a liquid crystal display, the display 120 may include a liquid display panel (not shown), a backlight unit (not shown) which supplies a light to the liquid display panel, and a panel driving substrate (not shown) which drives a panel (not shown).

The display 120 according to the present exemplary embodiment may include a touch-screen (not shown) which receives an input according to a user's touch. For example, the touch-screen may be embodied by using a resistive method, a capacitive method, an infrared method, or an acoustic wave method.

The display 120 according to the present exemplary embodiment displays information on a communication interface supported by the communicator 160. The controller 170 may control to inquire the communication interface information of the communicator 160 stored in the storage 150 and display the communication interface information on the display 120.

The user input unit 130 may transmit various predetermined control commands or unlimited information to the controller 170 based on a user manipulation or a user input.

The user input unit 130 according to an exemplary embodiment may receive an input signal from an input device which is located on a main body of the electronic apparatus 100 or located separately from the electronic apparatus 100. For example, the user input unit 130 may receive an input signal through a key pad (or an input panel) (not shown) which is provided on the main body of the electronic apparatus 100 and includes buttons such as number keys, menu keys, etc. Alternatively, the user input unit 130 may receive an input signal through a separate input device such as a remote controller which generates a command, data, information, or signal which is predetermined to control a TV remotely and transmit the command, data, information, or signal to the electronic apparatus 100, a keyboard, a mouse, etc. In this case, the separate input device may be an external apparatus which may perform wireless communication with the main body of the electronic apparatus 100, and the wireless communication may include infrared communication, RF communication, and a wireless Local Area Network (LAN). The input device may transmit a predetermined command to the electronic apparatus 100 according to a user manipulation.

Figure 16:
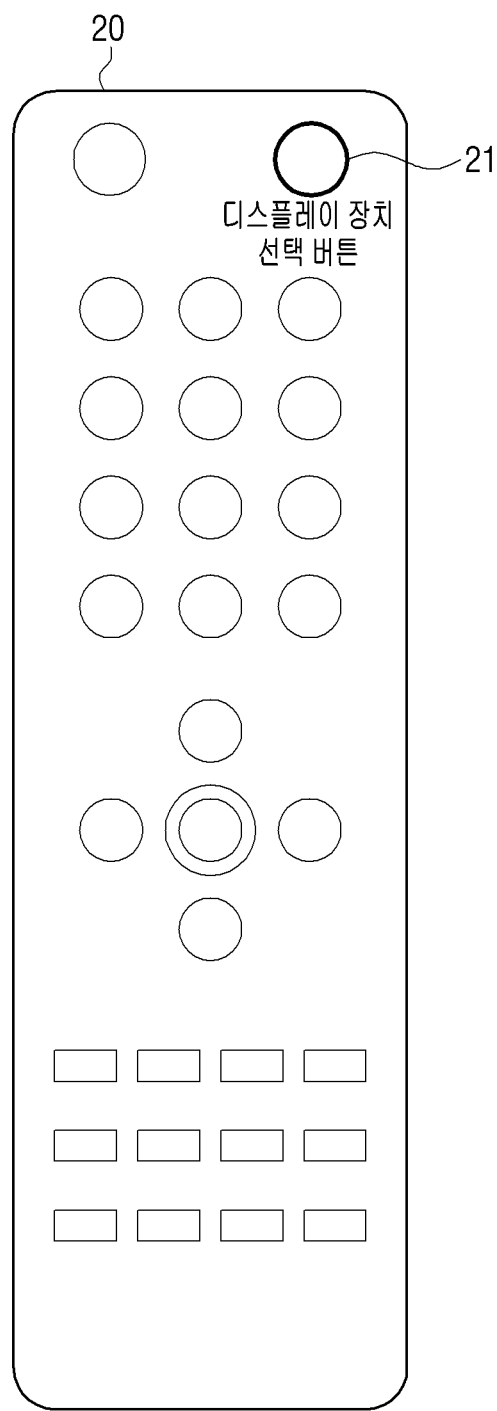
FIG. 16 is diagram provided to describe a remote controller according to an exemplary embodiment.

In particular, the user input unit 130 may receive an input signal from the remote controller 20 as illustrated in FIG. 16. The remote controller 20 according to an exemplary embodiment may include a selection button 21 to select a display device to be controlled. Accordingly, when the selection button 21 of the remote controller is pressed through a pointing operation or four direction keys of the remote controller 20 while a specific display device is highlighted, the heighted display device may be selected.

The image acquirer 140 may be embodied as a camera which photographs an external image. In this case, the camera may be located at a certain position, for example, on an upper side of the electronic apparatus 100, but the exemplary embodiments are not limited thereto. The camera may be located separate from the main body of the electronic apparatus 100 and located outside the electronic apparatus 100.

The image acquirer 140 may include a lens (not shown) to which an image is penetrated and an image sensor 141 which senses the image penetrated through the lens. The image sensor 141 may be embodied as a Charge-Coupled Device (CCD) or a Complementary Metal-Oxide Semiconductor (CDMA) image sensor.

The image acquirer 140 according to an exemplary embodiment may photograph an image displayed on a display of another apparatus and read information on a communication interface supported by the other apparatus.

The image received through the image acquirer 140 may be processed by the image processor 110. The controller 170 may extract communication interface information of the other apparatus which will be described below from the image processed by the image processor 110. The controller 170 may set communication connection with the other apparatus by using the extracted communication interface information.

The storage 150 may store an unlimited amount of data according to the control of the controller 170. The storage 150 may include a non-volatile memory, a volatile memory, a flash-memory, a Hard Disk Drive (HDD) or a Solid State Drive (SSD). The storage 150 may be accessed by the controller 170, and the data in the storage 150 may be read, recorded, modified, deleted, or updated by the controller 170.

The data stored in the storage 150 may include, for example, an operating system for driving the electronic apparatus 100 and various applications, which are executable in the operating system, image data, additional data, etc.

To be specific, the storage 150 may store a signal or data which is inputted or outputted to correspond to an operation of each component of the electronic apparatus 100, according to the control of the controller 170. The storage 150 may store a control program for controlling the electronic apparatus 100, a Graphic User Interface (GUI) related to an application which is provided by a manufacturer or downloaded from an external source, images for providing a GUI, user information, documents, databases, and related data.

According to an exemplary embodiment, the storage 150 may further store information on a communication interface (or information on a network interface) supported by the communicator 160. In this case, the storage 150 may store the communication interface information supported by the communicator 160 in advance. Alternatively, the storage 150 may be embodied so as to inquire or search for available communication interfaces in response to a connection request between apparatuses from a user, and store information corresponding to a result.

In the present exemplary embodiment, the term 'storage' may include the storage 150, a Read-Only Memory (ROM) or a Random Access Memory (RAM) in the controller 170, or a memory card (not shown) which is mounted to the electronic apparatus 100 (for example, a micro Secure Digital (SD) card or a memory stick).

The communicator 160 may communicate with other apparatus. According to an exemplary embodiment, the communicator 160 may support at least one of communication interfaces 1 to N such as Wireless-Fidelity (Wi-Fi), Bluetooth, Radio Frequency (RF), Zigbee, wireless Local Area Network (LAN), infrared communication, Ultra Wideband (UWB), and Near Field Communication (NFC).

According to an exemplary embodiment, the communicator 160 may be embedded in the main body of the electronic apparatus 100 or may be embodied as a dongle or a module and detachably mounted to a connector (not shown) of the electronic apparatus 100.

The controller 170 may perform a control operation with respect to various components of the electronic apparatus 100. For example, the controller 170 may control overall operations of the electronic apparatus 100 by performing an image processing operation of the image processor 110, a corresponding control operation with respect to an input signal received by the user input unit 130, etc. For example, the controller 170 may be embodied in a form where a Central Processing Unit (CPU) and software are combined.

The controller 170 may control the overall operations of the electronic apparatus 100 and a signal flow of internal components 110 to 160 of the electronic apparatus 100 and perform a function of processing data. In addition, the controller 170 may control power which is supplied from a power supplier (not shown) to the internal components 110 to 160. In addition, in response to a user input being received or a predetermined condition being satisfied, the controller 170 may execute an Operating System (OS) and various applications stored in the storage 150.

Hereinafter, a process of controlling the plurality of display apparatuses 11 to 19 in system 10 in FIG. 1 will be described with reference to FIGS. 3 to 10.

Figure 3:
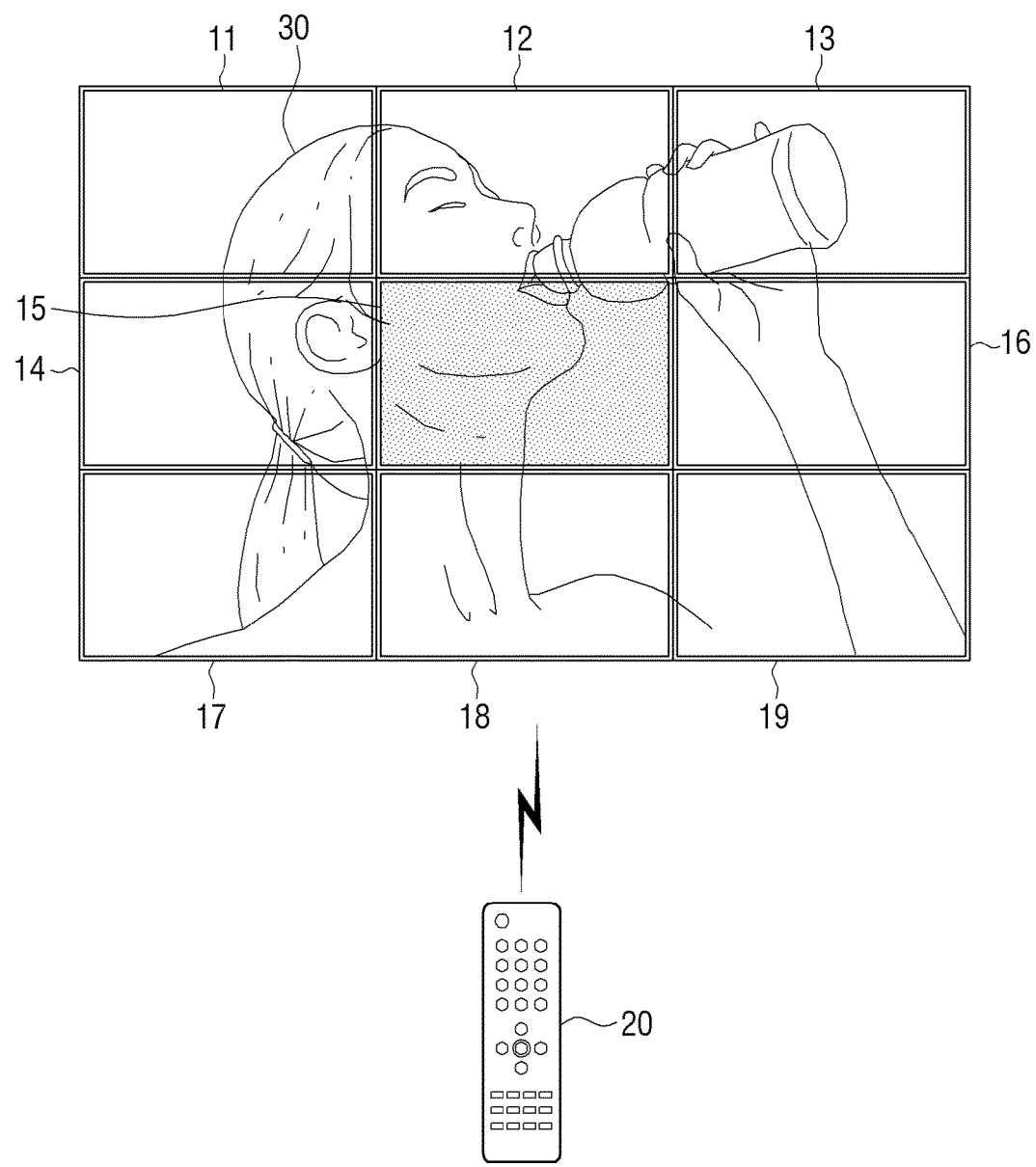
FIG. 3 is a diagram illustrating a plurality of combined display apparatuses according to an exemplary embodiment.

FIG. 3 is a diagram illustrating a plurality of combined display apparatuses 11 to 19 according to an exemplary embodiment.

Referring to FIG. 3, the plurality of display apparatuses 11 to 19 may be combined with each other in order to form a large screen. In this case, one of the plurality of display apparatuses 11 to 19 is determined to be a master display apparatus, and the other display apparatuses may be determined to be slave display apparatuses. For example, a master display apparatus may be the display apparatus 15 which is located at the center of the plurality of display apparatuses 11 to 19. Alternatively, the master display apparatus may be the display apparatus 19 which is located on a lowermost right side among the plurality of display apparatuses 11 to 19. Alternatively, the master display apparatus may be the display apparatus 15 which includes the image acquirer 140 among the plurality of display apparatuses 11 to 19. Hereinafter, it is assumed that the master display apparatus is the display apparatus 15 which is located in the center of the plurality of display apparatuses 11 to 19. However, this is merely an example and the master display apparatus can be selected based on, for example, a user's preference.

The controller 170 of the master display apparatus 15 may control an image 30 to be divided and displayed on the plurality of display apparatuses 11 to 19. For example, an image receiver (not shown) of the master display apparatus 15 receives the image 30, and the controller 170 of the master display apparatus 15 may divide the received image 30 into images corresponding to the number of the plurality of display apparatuses 11 to 19. In addition, the communicator 160 of the master display apparatus 15 may transmit each of the divided images to each of the plurality of display apparatuses 11 to 14 and 16 to 19 so that the image 30 is displayed on a large screen formed by combining the plurality of display apparatuses 11 to 19. In addition, the controller 170 of the master display apparatus 15 may display one image among the divided images through the display 120 of the master display apparatus 15.

According to another exemplary embodiment, the image receiver of each of the plurality of display apparatuses 11 to 19 may receive the image 30. In this case, the controller 170 of the master display apparatus 15 may control each of the plurality of display apparatuses 11 to 19 to display each of different parts of the image 30 so that the image 30 is displayed on a large screen formed by combining the plurality of display apparatuses 11 to 19.

When display apparatus 15 is identified as the master display apparatus, the controller 170 of the master display apparatus 15 may control only the user input unit 130 of the master display apparatus 15 among the plurality of display apparatuses 11 to 19 to be activated and control the user input unit 130 of each of the other display apparatuses 11 to 14 and 16 to 19 to be inactivated. By controlling the user input unit 130 of the master display apparatus 15 to be activated, the master display apparatus 15 will operate in response to a remote controller signal transmitted from the remote controller 20.

FIG. 4 is a diagram illustrating a plurality of combined display apparatuses 11 to 19 and an external apparatus 401 controlling the plurality of combined display apparatuses 11 to 19 according to an exemplary embodiment.

Referring to FIG. 4, the plurality of display apparatuses 11 to 19 may be combined with each other in order to form a large screen. The external apparatus 401 may be, for example, a Set-top box, of the electronic apparatus 100. The controller 170 of the external apparatus 401 may control the image 30 to be divided and displayed on the plurality of display apparatuses 11 to 19. For example, an image receiver of the external apparatus 401 may receive the image 30, and the controller 170 of the external apparatus 401 may divide the received image 30 into images corresponding to the number of the plurality of display apparatuses 11 to 19. In addition, the communicator 160 of the external apparatus 401 may transmit each of the divided images to each of the plurality of display apparatuses 11 to 19 so that the image 30 is displayed on a large screen which is a combination of the plurality of display apparatuses 11 to 19. The external apparatus 401 may be controlled by a remote controller signal transmitted from the remote controller 20 or an input signal inputted through a button on a main body of the external apparatus 401.

As described above, the electronic apparatus 100 which controls the plurality of display apparatuses 11 to 19 may be the master display apparatus 15 or may be the external apparatus 401. However, in the present exemplary embodiment, it is assumed that the electronic apparatus 100 which controls the plurality of display apparatuses 11 to 19 is the master display apparatus 15 included in the plurality of display apparatuses 11 to 19.

Figure 5A:
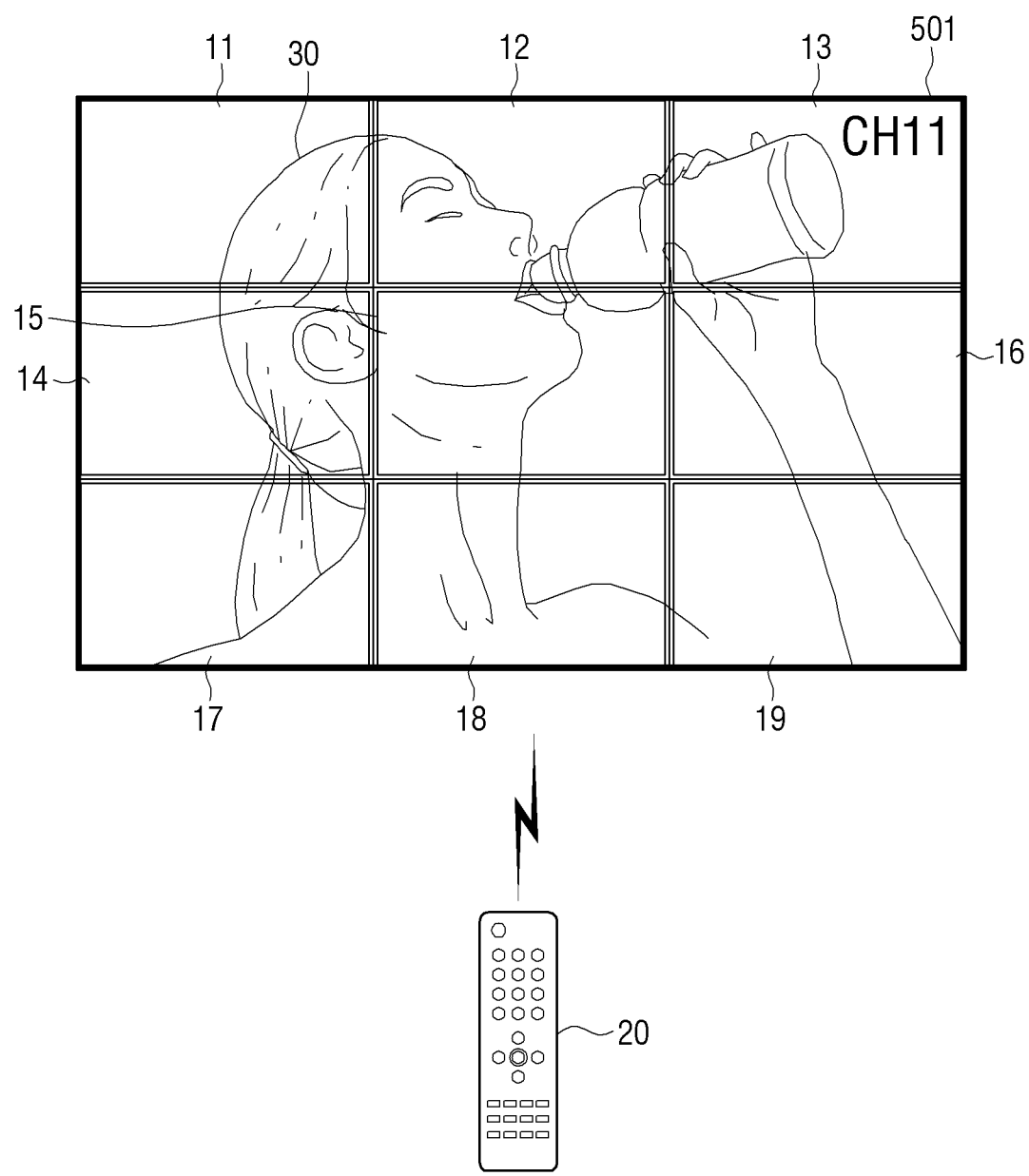
FIGS. 5A and 5B are diagrams provided to describe a process of controlling a plurality of display apparatuses by using a remote controller according to an exemplary embodiment.
Figure 5B:
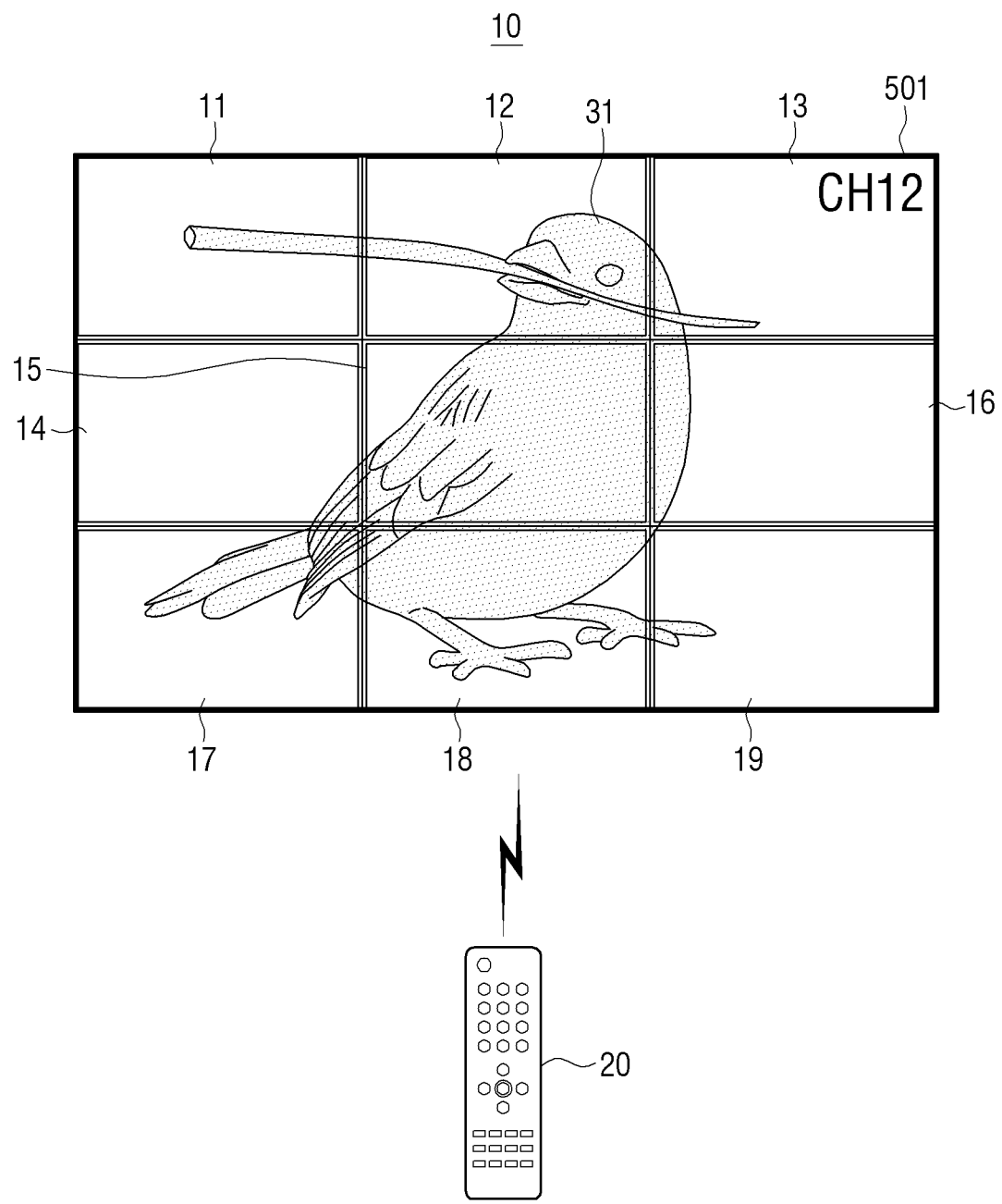

FIGS. 5A and 5B are diagrams provided to describe a process of controlling a plurality of display apparatuses 11 to 19 by using the remote controller according to an exemplary embodiment.

Referring to FIG. 5A, a large screen in which the plurality of display apparatuses 11 to 19 are combined may display the image 30. In this case, a user is able to press a button of the remote controller 20 briefly, within, for example a predetermined time such as one second. The length of the predetermined time can change as desired by, for example, the user.

Referring to FIG. 5B, the user input unit 130 of the master display apparatus 15 may receive a user input signal created when the user presses a button of the remote controller 20 within a predetermined time while the image 30 is displayed on the large screen. In this case, the controller 170 of the master display apparatus 15 may determine that the user controls the large screen and may perform a function corresponding to the button of the remote controller 20 which is aimed at the large screen. For example, the controller 170 of the master display apparatus 15 may change the image 30 displayed on the large screen, made up of the combination of the plurality of display apparatuses 11 to 19, to another image 31 in response to a received input signal. As a specific example, in response to a broadcasting image 30 corresponding to a channel being displayed on the large screen in which the plurality of display apparatuses 11 to 19 are combined, the controller 170 of the master display apparatus 15 may control a broadcasting image 31 corresponding to another channel to be displayed on the plurality of display apparatuses 11 to 19 in response to the received input signal.

In order to show that the large screen is selected and controlled, the controller 170 of the master display apparatus 15 may control the brightness or the color of a bezel 501 of the plurality of display apparatuses 11 to 19, corresponding to an edge of the large screen, to change or to flicker for a predetermined time. As another example, the controller 170 of the master display apparatus 15 may control the brightness or color of the entire area of the display 120 of the plurality of display apparatuses 11 to 19, which make up the large screen, to change or to flicker for a predetermined time. As still another example, the controller 170 of the master display apparatus 15 may control the brightness or color of an edge area of the display 120 of the plurality of display apparatuses 11 to 19 which are the objects of the large screen to be changed or to flicker for a predetermined time.

Figure 6A:
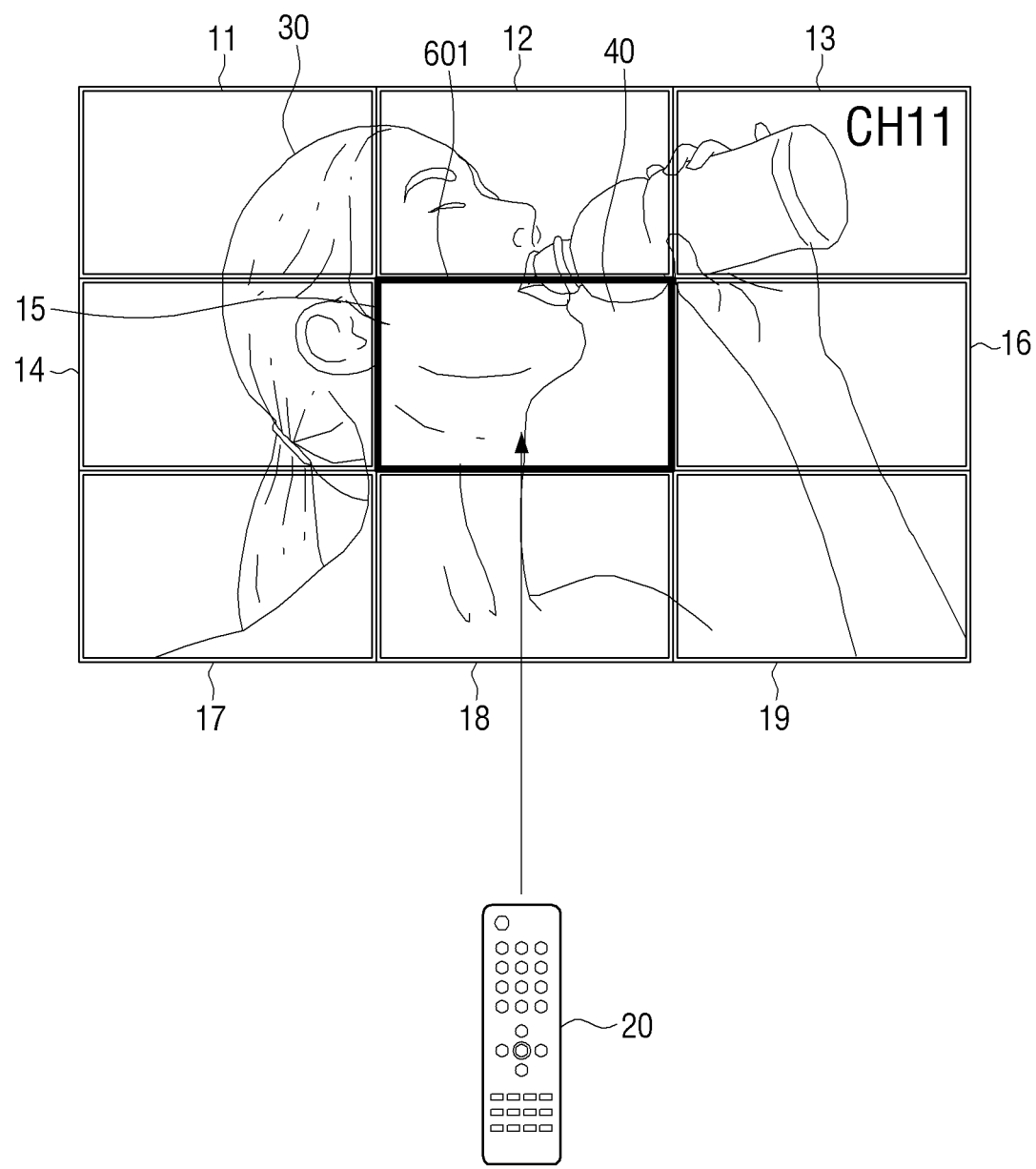
FIGS. 6A to 6C are diagrams provided to describe a process of controlling one display apparatus among a plurality of display apparatuses by using a remote controller according to an exemplary embodiment.
Figure 6B:
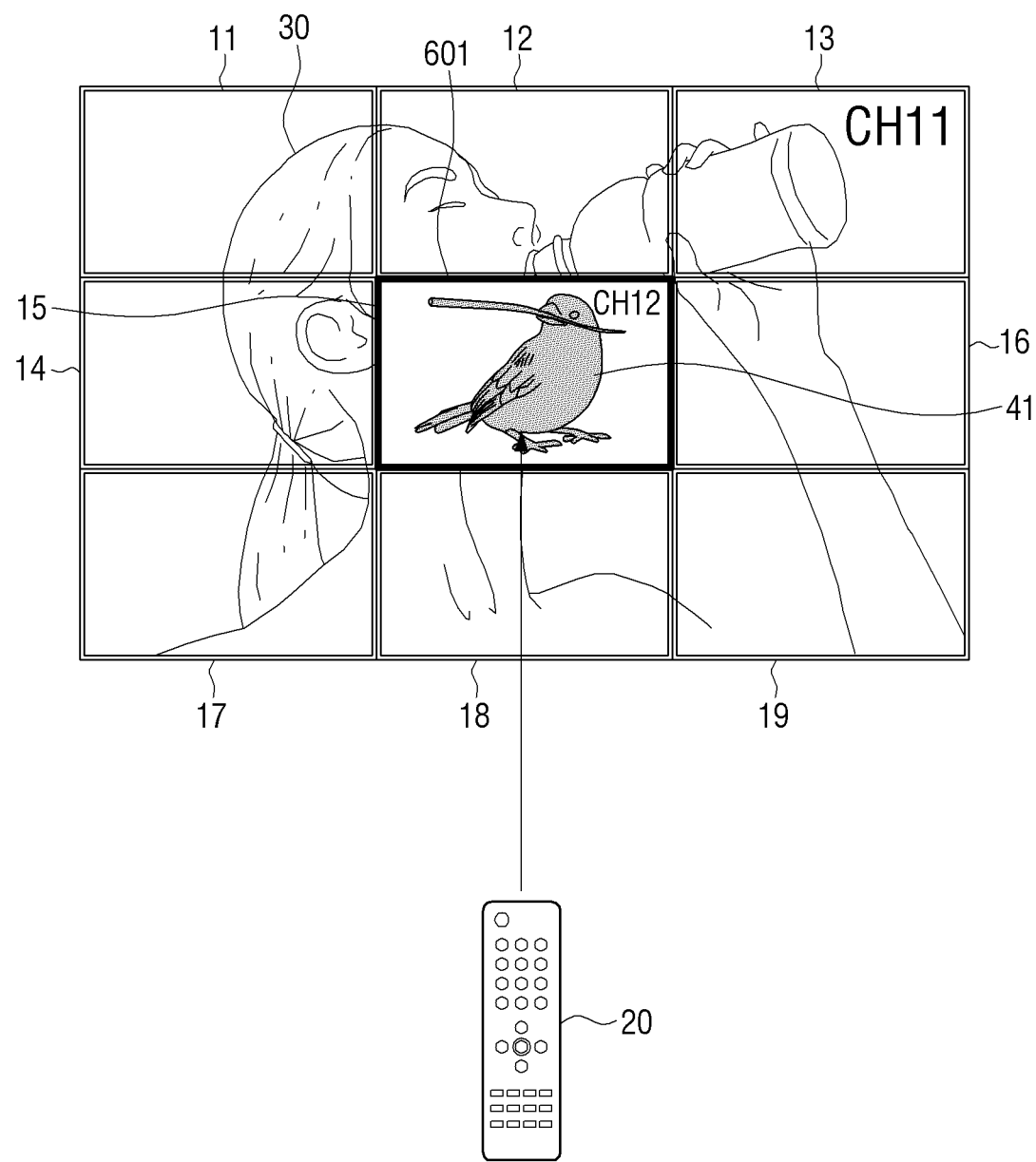
Figure 6C:
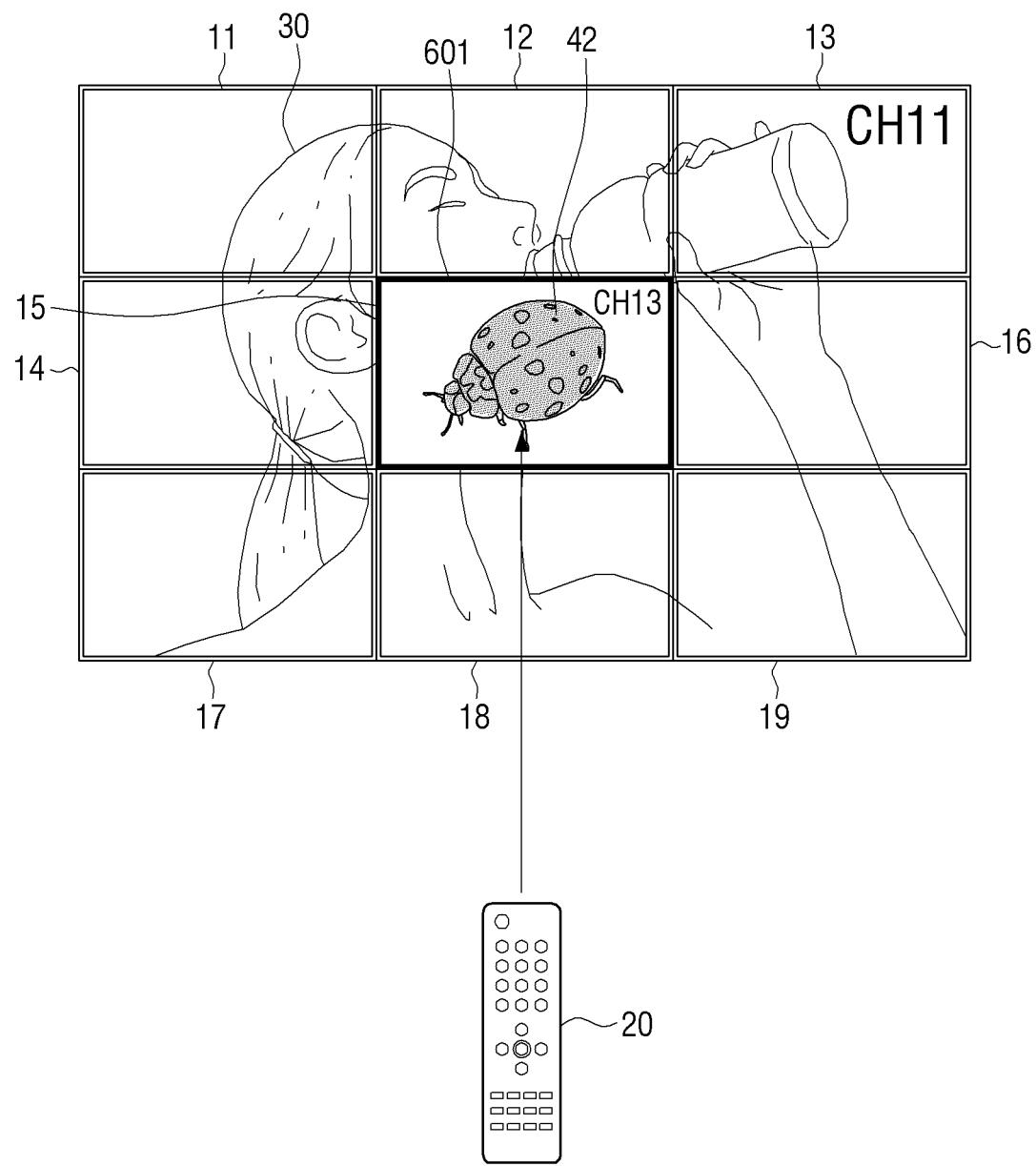

FIGS. 6A to 6C are diagrams provided to describe a process of controlling one display apparatus among a plurality of display apparatuses 11 to 19 by using the remote controller 20 according to an exemplary embodiment.

Referring to FIG. 6A, the large screen, which is formed by combining the plurality of display apparatuses 11 to 19, may display the image 30. In this case, the user is able to press a button of the remote controller 20 for a particular length of time, for example, above a predetermined time such as one second. The length of the predetermined time can change as desired by, for example, the user.

Referring to FIG. 6B, the user input unit 130 of the master display apparatus 15 may receive a user input signal created when the user presses a button of the remote controller 20 above a predetermined time while the image 30 is displayed on the large screen. In this case, the controller 170 of the master display apparatus 15 may determine that the user controls one display apparatus among the plurality of display apparatuses 11 to 19. The one display apparatus, for example, may be the master display apparatus 15.

In response to the user input signal of pressing a button of the remote controller 20 above a predetermined time and releasing the pressing of the button of the remote controller 20 being received by the user input unit 130 of the master display apparatus 15, the controller 170 of the master display apparatus 15 may perform a function corresponding to the button of the remote controller 20 which is aimed at a display apparatus. For example, in response to the received input signal, the controller 170 of the master display apparatus 15 may change a part 40 of the image 30 displayed on the display 120 of the master display apparatus 15 to another image 41.

In order to show that the master display apparatus 15 is the display apparatus which is selected and controlled, the controller 170 of the master display apparatus 15 may control the brightness or color of a bezel 601 of the master display apparatus 15 to change or to flicker for a predetermined time. As another example, the controller 170 of the master display apparatus 15 may control the brightness or color of the entire area of the display 120 of the master display apparatus 15 to change or to flicker for a predetermined time. As still another example, the controller 170 of the master display apparatus 15 may control the brightness or color of the edge area of the display 120 of the master display apparatus 15 to be changed or to flicker for a predetermined time.

In a predetermined time (for example, five seconds) after the display apparatus is selected, the user is able to press the button of the remote controller 20 briefly, within a predetermined time (for example, one second.)

Referring to FIG. 6C, the user input unit 130 of the master display apparatus 15 may receive a user input signal which is created by the user pressing the button of the remote controller 20 within a predetermined time after one display apparatus 15 is selected. In response to the received input signal, the controller 170 of the master display apparatus 15 may perform a function corresponding to the button of the remote controller 20. For example, the controller 170 of the master display apparatus 15 may change the image 41 displayed on the display 120 of the master display apparatus 15 to another image 42. In this case, in order to show that the master display apparatus 15 is selected and controlled, the controller 170 of the master display apparatus 15 may control the brightness or color of the bezel 601 of the master display apparatus 15 to change or to flicker for a predetermined time.

In response to the user input unit 130 of the master display apparatus 15 not receiving a signal from the remote controller 20 within a predetermined time (for example, five seconds), the controller 170 of the master display apparatus 15 may change the object to be controlled by user input from the master display apparatus 15 to the large screen which is made up of the plurality of display apparatuses 11 to 19.

Alternatively, in response to the user input unit 130 of the master display apparatus 15 receiving a user input signal created when the user presses a button on the remote controller 20 to change an object to be controlled, the controller 170 of the master display apparatus 15 may change the object to be controlled by a user input from the master display apparatus 15 to the large screen in which is made up of the plurality of display apparatuses 11 to 19.

If the object to be controlled by a user input changes from the master display apparatus 15 to the large screen made up of the plurality of display apparatuses 11 to 19, the controller 170 of the master display apparatus 15 may control the brightness or color of a bezel of the plurality of display apparatuses 11 to 19, which corresponds to the edge of the large screen, to change or to flicker for a predetermined time.

Figure 7A:
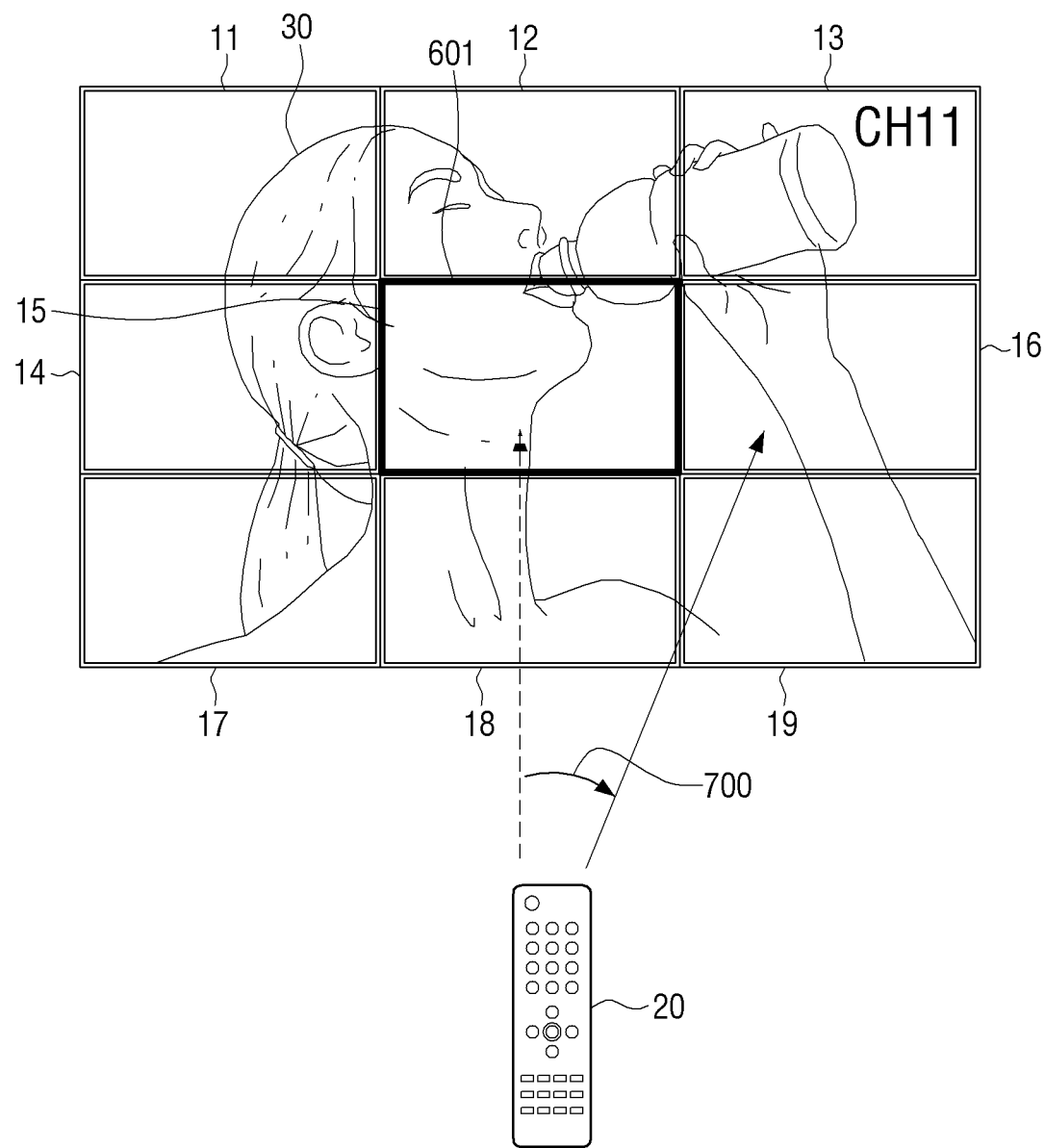
FIGS. 7A and 7B are diagrams provided to describe a process of selecting one display apparatus by using a remote controller according to an exemplary embodiment.
Figure 7B:
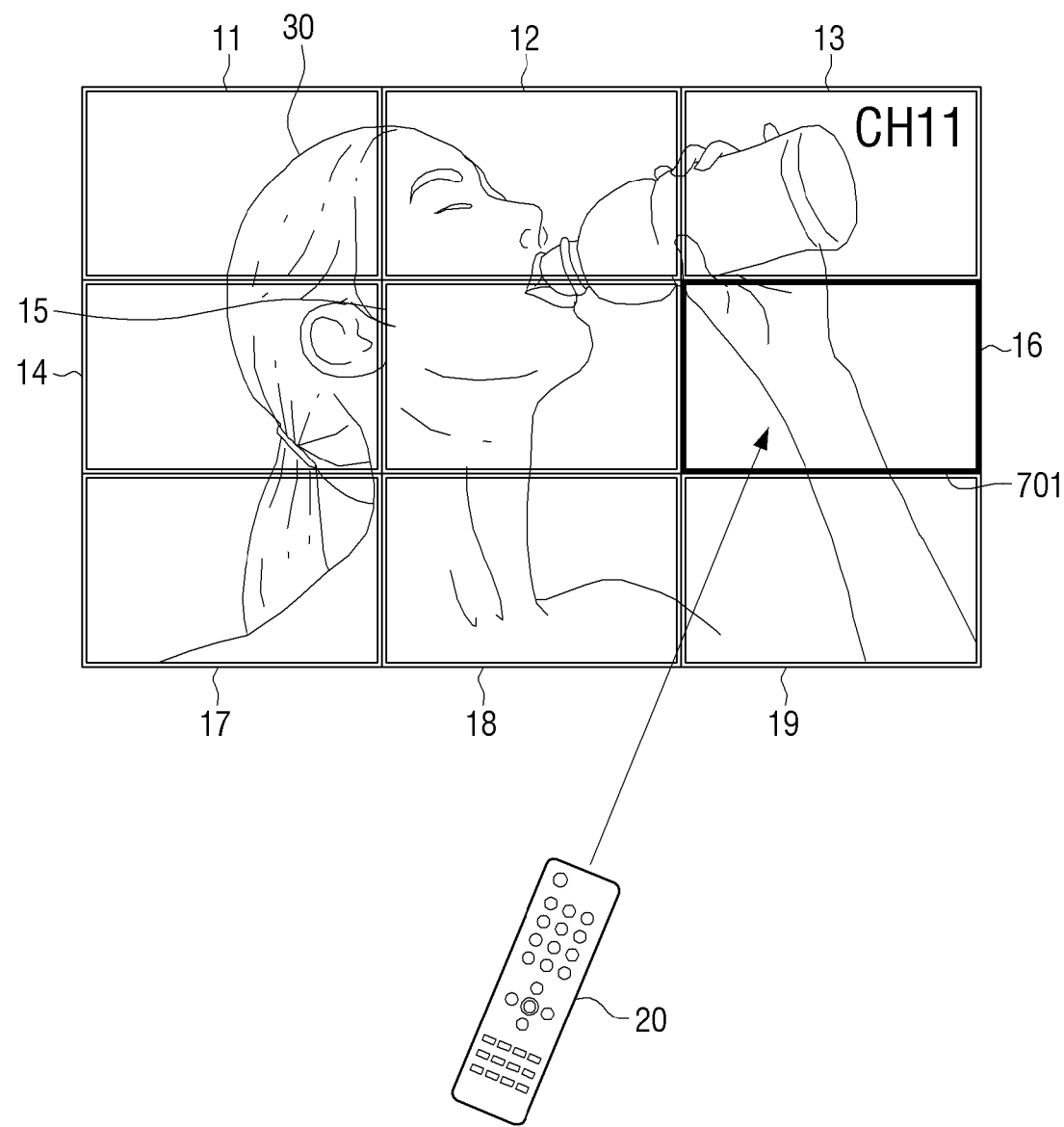

FIGS. 7A and 7B are diagrams provided to describe a process of selecting one display apparatus by using a remote controller according to an exemplary embodiment.

Referring to FIG. 7A, one display apparatus may be selected from among the plurality of display apparatuses 11 to 19. For example, in response to a user manipulation of pressing a button of the remote controller 20 above a predetermined time while the image 30 is displayed on the large screen, the master display apparatus 15 may be selected. In addition, as a result, the brightness or color of the bezel 601 of the master display apparatus 15 may change or may flicker for a predetermined time.

In this case, the user may tilt the remote controller 20 by a certain angle 700 or move the remote controller 20 in a certain direction while pressing the button of the remote controller 20 above a predetermined time (for example, five seconds.)

Referring to FIG. 7B, the user input unit 130 or the image acquirer 140 of the master display apparatus 15 may receive a user input signal of tilting the remote controller 20 or moving the remote controller 20 in a certain direction. For example, if the remote controller 20 includes a motion sensor, the remote controller 20 may acquire a pointing angle of the remote controller 20 according to a user operation and provide the user input unit 130 of the master display apparatus 15 with the acquired pointing angle.

Alternatively, the image acquirer 140 of the master display apparatus 15 may acquire an image when the remote controller 20 is tilted or moved in a certain direction according to the user operation and recognize a tilt angle or a moved direction or distance from the acquired image.

The controller 170 of the master display apparatus 15 may determine that the display apparatus 16 to which the remote controller 20 of the user points based on the tilted angle or the moved direction or the distance of the remote controller 20, is to be acquired by the user input unit 130 or the image acquirer 140. In this case, in order to show that display apparatus 16 is selected and controlled, the controller 170 of the master display apparatus 15 may control the brightness or color of a bezel 701 of the selected display apparatus 16 to be change or to flicker for a predetermined time.

In the aforementioned exemplary embodiment, a display apparatus to which the remote controller 20 points is determined as the image acquirer 140 of the master display apparatus 15 and acquires an image when the remote controller 20 is tilted or moved in a certain direction. However, this is merely an exemplary embodiment. The display apparatus to which the remote controller 20 points may be determined by other methods. For example, in case of the remote controller 20 including a motion sensor (for example, an acceleration sensor, a geomagnetic sensor, a gyro sensor, etc.), the remote controller 20 may acquire motion information by using the motion sensor and transmit the acquired motion information to the master display apparatus 15. The master display apparatus 15 may determine a display apparatus 16 to which the remote controller 20 points by determining a tilted angle or a moved direction or a distance of the remote controller 20 based on the acquired motion information.

In addition, in the aforementioned exemplary embodiment, the user selects one display apparatus by using a motion of the remote controller. However, the user can select a display apparatus by using other methods. For example, a user can select a display apparatus by using various methods such as a button mounted on a remote controller, a voice recognition device, an eye recognition device, an eye motion recognition, etc.

FIGS. 8A to 8D are diagrams provided to describe a process of controlling one display apparatus among the plurality of display apparatuses 11 to 19 according to an exemplary embodiment.

Figure 8A:
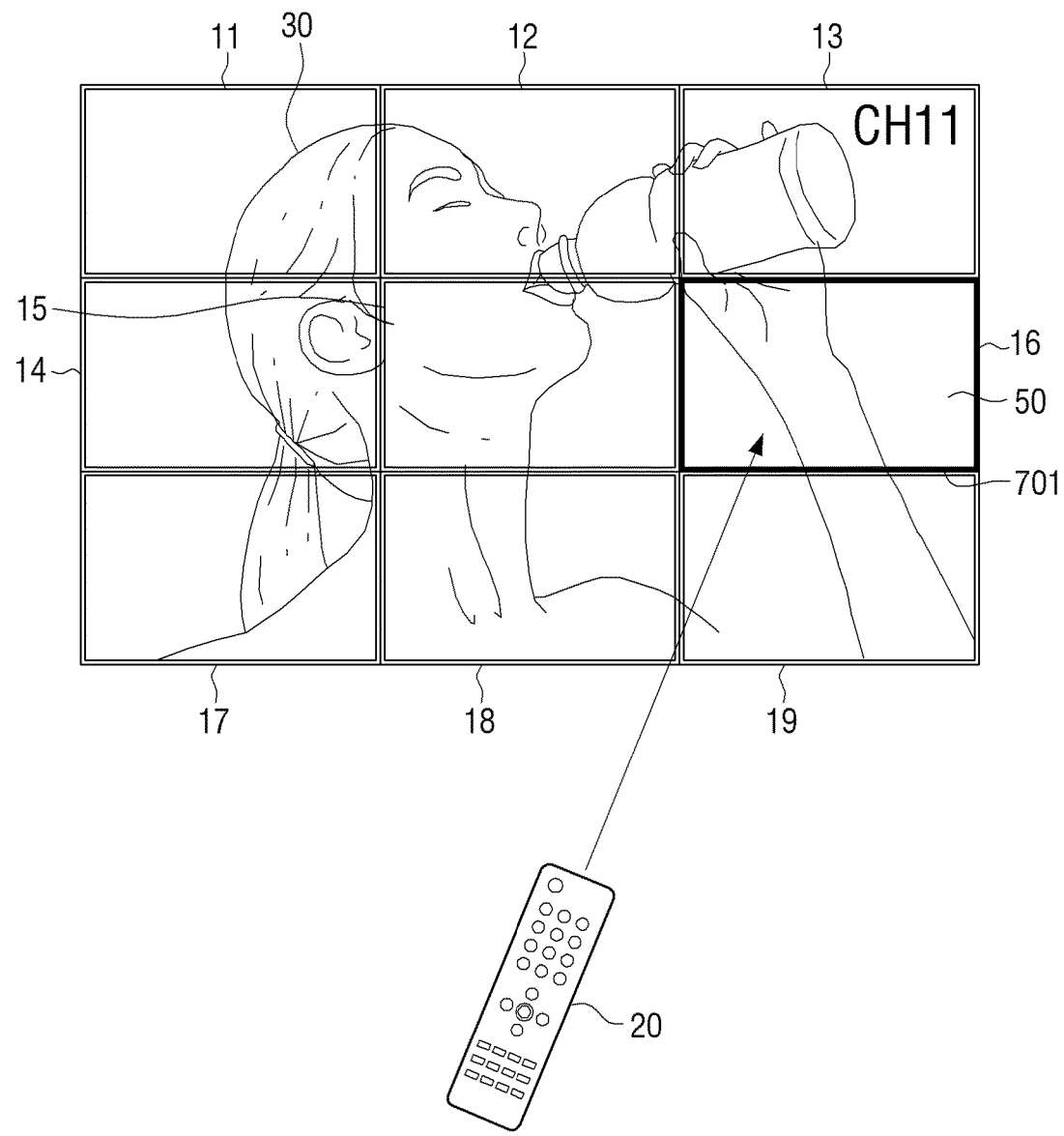
FIGS. 8A to 8D are diagrams provided to describe a process of controlling one display apparatus among a plurality of display apparatuses according to an exemplary embodiment.

Referring to FIG. 8A, in response to the image 30 being displayed on the large screen which is made by combining the plurality of display apparatuses 11 to 19, the user is able to select one display apparatus, such as display apparatus 16, from among the plurality of display apparatuses 11 to 19. In this case, as described above, the one display apparatus 16 may be selected by an operation of tilting the remote controller 20 towards display apparatus 16 or moving the remote controller 20 in a certain direction while the user presses a button of the remote controller 20 above a predetermined time (for example, five seconds). In this case, in order to show that display apparatus 16 is selected, the controller 170 of the master display apparatus 15 may control the brightness or color of the bezel 701 of the display apparatus 16 to change or to flicker for a predetermined time.

The user is able to select a button of the remote controller 20, which corresponds to a function of changing a part 50 of the first image 30 displayed on display apparatus 16 to another image.

Figure 8B:
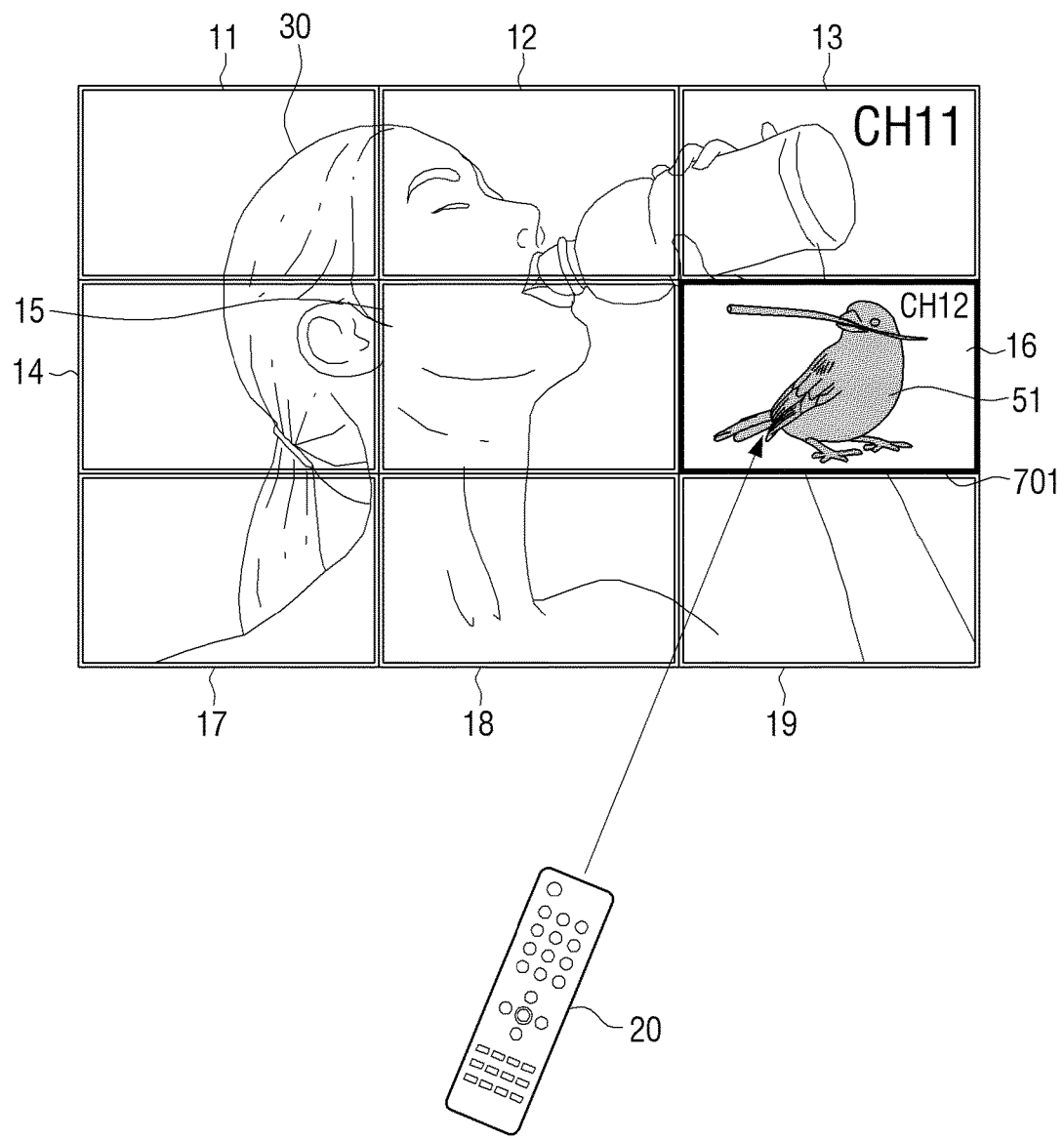

Referring to FIG. 8B, the user input unit 130 of the master display apparatus 15 may receive a signal for changing the part 50 of the first image 30 displayed on the one display apparatus 16 to a second image 51.

In response to the signal, the controller 170 of the master display apparatus 15 may control the part 50 of the first image 30 to be changed to the second image 51 and display the second image 51 on the display apparatus 16. In addition, the controller 170 of the master display apparatus 15 may control the displayed first image 30 to be continuously displayed without any changes on the display 120 of each of the plurality of display apparatuses 11 to 19. That is, the second image 51 may be displayed as a form of a Picture in Picture (PIP) of the first image 30.

Figure 8C:
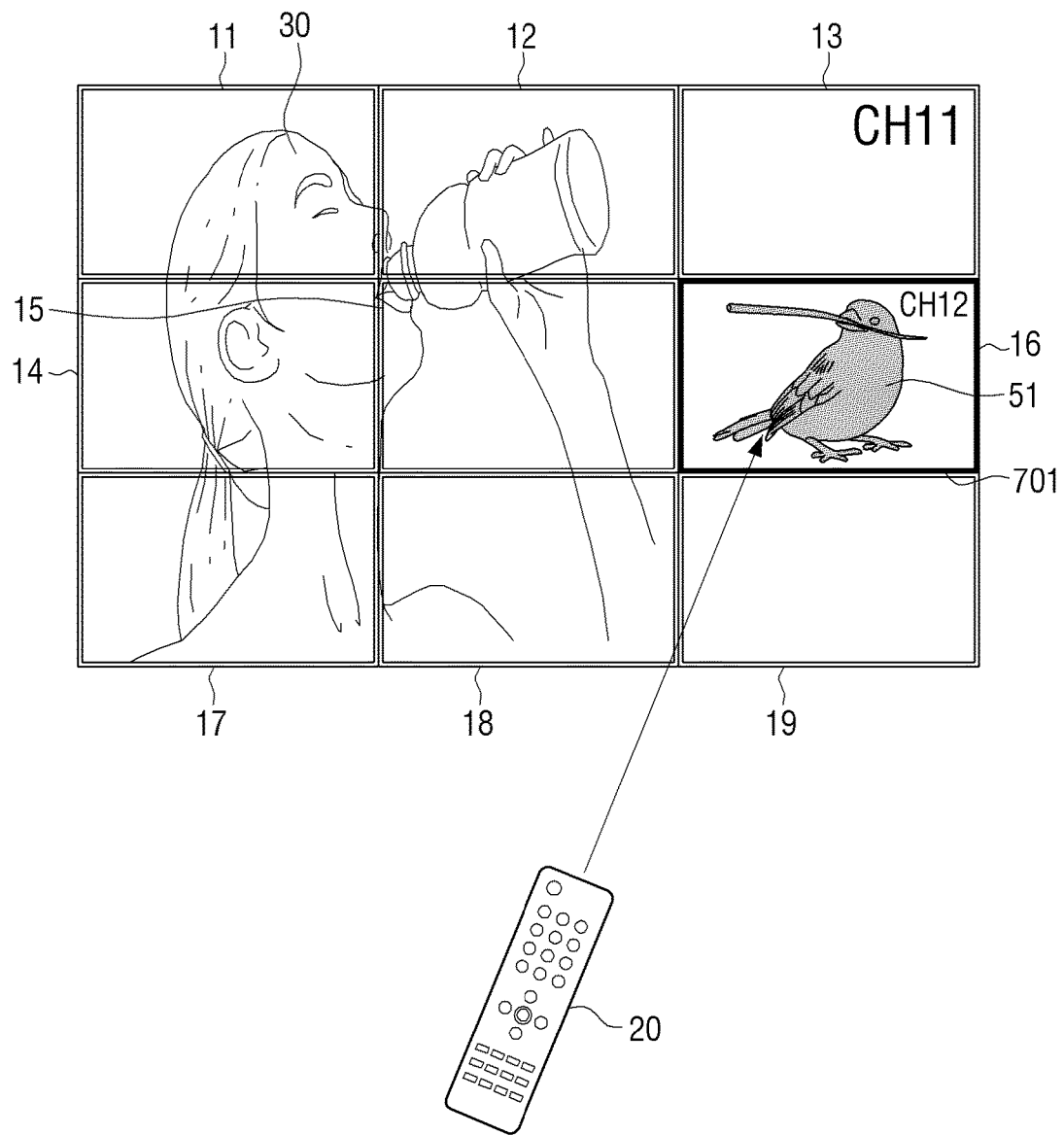

Referring to FIG. 8C which is another exemplary embodiment of FIG. 8B, in response to a user input of selecting a button of the remote controller 20 in FIG. 8A, the user input unit 130 of the master display apparatus 15 may receive a signal to change the part 50 of the first image 30 displayed on display apparatus 16 to the second image 51.

In response to the signal received in the user input unit 130 of the master display apparatus 15, the controller 170 of the master display apparatus 15 may control the part 50 of the first image 30 to change to the second image 51 and display the second image 51 on display apparatus 16. In addition, the controller 170 of the master display apparatus 15 may control the first image 30 to be re-divided into six images corresponding to the number of the plurality of display apparatuses 11, 12, 14, 15, 17, and 18 and displayed on a group of the plurality of display apparatuses 11, 12, 14, 15, 17, and 18. Accordingly, the display 120 of display apparatus 16 may display the second image 51, and the displays of the group of plurality of display apparatuses 11, 12, 14, 15, 17, and 18 may display the re-divided first image 30. That is, the second image 51 may be displayed as a form of the Picture out Picture (POP) of the first image 30.

According to an exemplary embodiment, the display 120 of the display apparatuses 13 and 19 except for the group of the plurality of display apparatuses 11, 12, 14, 15, 17, and 18 and the one display apparatus 16 among the plurality of display apparatuses 11 to 19 may display information such as an empty screen, channel information, advertisement information, or an application (for example, widget).

Figure 8D:
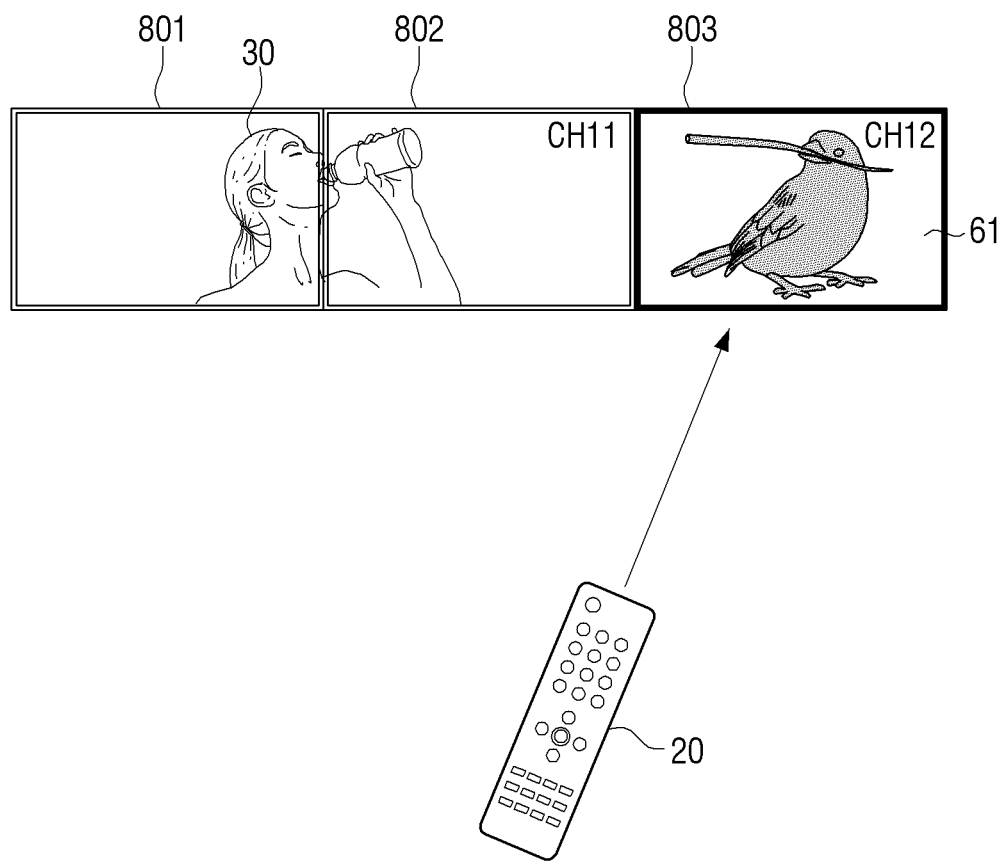

FIG. 8D is another exemplary embodiment of FIG. 8B. As shown in FIG. 8D, if the large screen is formed by combining a plurality of display apparatuses 801 to 803 and displays a first image, in response to a signal received in the user input unit 130 of the master display apparatus 802, the controller 170 of the master display apparatus 802 may control a part of the first image 30 to be changed to a second image 61 and display the second image 61 on one display apparatus 803.

In addition, the controller 170 of the master display apparatus 802 may control the first image 30 to be re-divided into two images corresponding to the number of the other display apparatuses 801 and 802, other than display apparatus 803, among the plurality of display apparatuses 801 to 803 and display the first image 30 on the plurality of display apparatuses 801 and 802. Accordingly, the display 120 of display apparatus 803 may display the second image 61, and the other plurality of display apparatuses 801 and 802 may display the re-divided first image 30. That is, the second image 61 may be displayed as a form of a POP of the first image 30.

Figure 9:
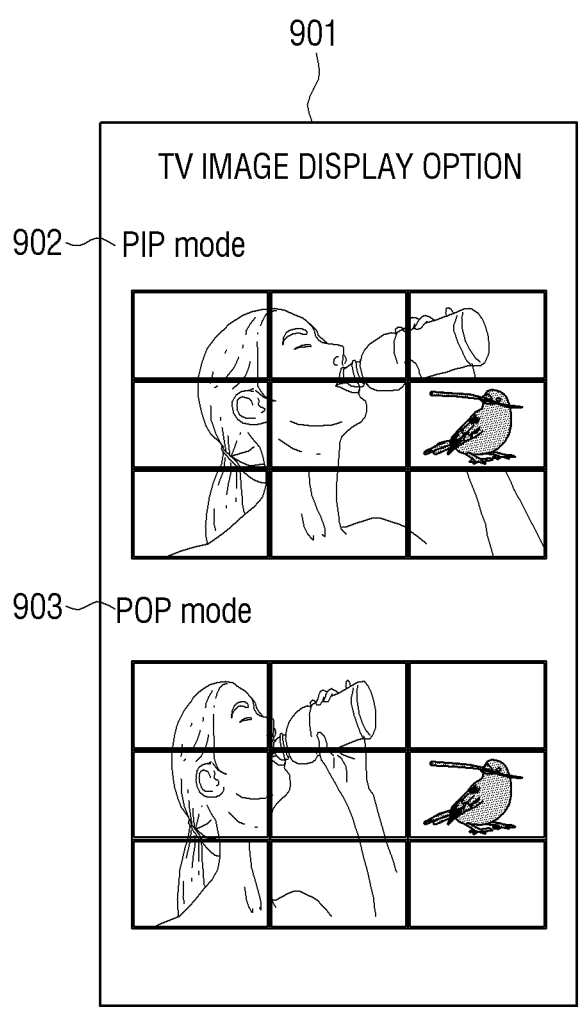
FIG. 9 is a diagram illustrating a menu for determining a method of displaying an image on a plurality of display apparatuses according to an exemplary embodiment.

FIG. 9 is a diagram illustrating a menu for determining a method of displaying an image on a plurality of display apparatuses according to an exemplary embodiment.

Referring to FIG. 9, the controller 170 of the master display apparatus may provide a menu 901 for receiving an input set by a user. For example, the menu 901 may be provided as a form of an On-Screen Display (OSD) through the display 120 of the master display apparatus. In addition, the menu 901 may be provided in response to a button mounted on a main body of the master display apparatus being selected, or in response to a certain button of the remote controller 20 being selected.

The menu 901 may include a PIP mode 902 for displaying the second image as a form of PIP of the first image and a POP mode 903 for displaying the second image as a form of POP of the first image. The user is able to select either the PIP mode 902 and the POP mode 903 which is displayed on the menu 901.

In response to the PIP mode 902 being selected and receiving a signal for changing the first image displayed on one display apparatus among a plurality of display apparatuses to the second image, the controller 170 of the master display apparatus may control the first image displayed on the plurality of display apparatuses to be continuously displayed and control only a part of the first image displayed on the one display apparatus to be changed to the second image.

In response to the POP mode 903 being selected and receiving a signal for changing the first image displayed on the one display apparatus among the plurality of display apparatuses to the second image, the controller 170 of the master display apparatus may control the first image displayed on the one display apparatus to be changed to the second image and control the first image to be re-divided into images corresponding to the number of a group of plurality of display apparatuses among the plurality of display apparatuses and displayed on the group of plurality of display apparatuses.

As another exemplary embodiment of determining a method of displaying an image on a plurality of display apparatuses, in response to receiving a signal for changing the first image displayed on the one display apparatus among the plurality of display apparatuses to the second image, the controller 170 of the master display apparatus may determine whether to display the second image as a form of the PIP of the first image or display the second image as a form of the POP of the first image, by considering at least one of the number and an arrangement of the plurality of display apparatuses.

If one or more display apparatuses exist which do not display any of the first image and the second image, the controller 170 of the master display apparatus may display the second image as a form of the PIP of the first image.

As an example, if display apparatuses 13 and 19 do not display any of the first image and the second image as in FIG. 8C, and a signal for changing the first image displayed on one display apparatus among the plurality of display apparatuses to the second image is received, the controller 170 of the master display apparatus 15 may display the second image as a form of the PIP of the first image, as shown in FIG. 8B.

As another example, if there are no display apparatuses which do not display any of the first image and the second image when the second image is displayed as a form of the POP of the first image as shown in FIG. 8B, in response to a signal for changing the first image displayed on the one display apparatus among the plurality of display apparatuses to the second image being received, the controller 170 of the master display apparatus 802 may display the second image as a form of the POP of the first image as shown in FIG. 8D.

Figure 10A:
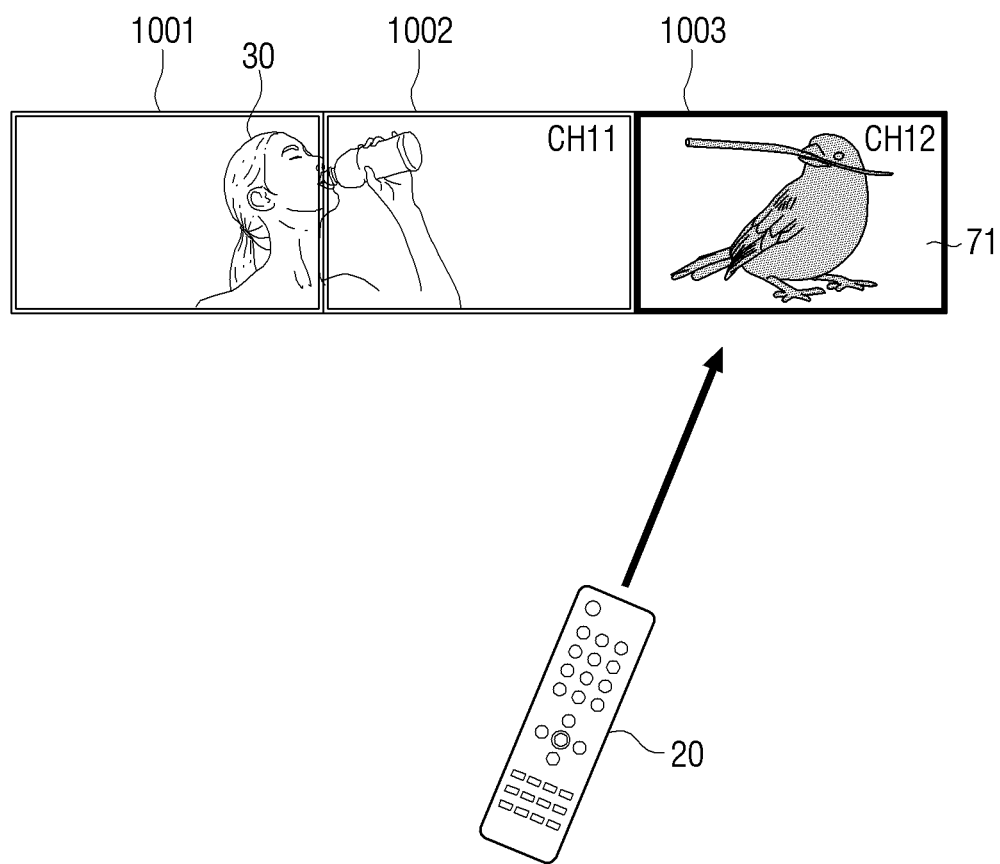
FIGS. 10A and 10B are diagrams provided to describe a process of controlling one display apparatus among a plurality of display apparatuses according to an exemplary embodiment.
Figure 10B:
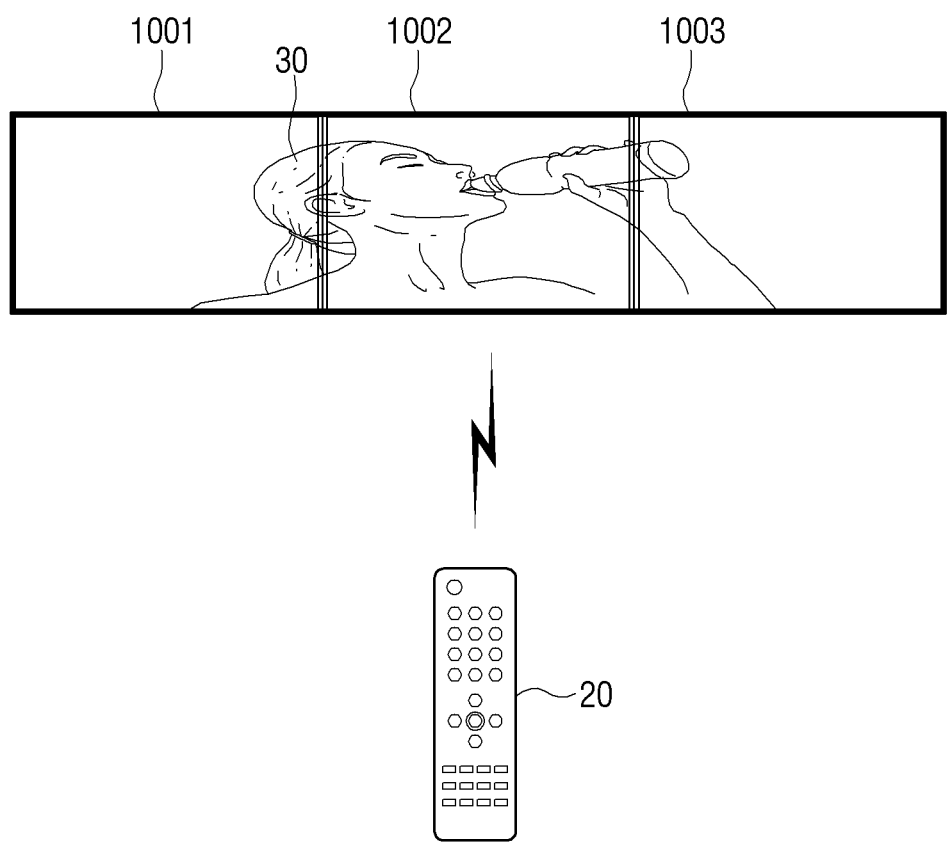

FIGS. 10A and 10B are diagrams provided to describe a process of controlling one display apparatus among a plurality of display apparatuses according to an exemplary embodiment.

Referring to FIG. 10A, the first image may be displayed on a plurality of display apparatuses 1001 and 1002, and a second image 71 may be displayed on one display apparatus 1003 other than the plurality of display apparatuses 1001 and 1002. In this case, a user is able to select a button of the remote controller 20, which corresponds to a function of changing the second image 71 displayed on the one display apparatus 1003 to a part of the first image 30.

Referring to FIG. 10B, the user input unit 130 of the master display apparatus 1002 may receive a signal for changing the second image 71 displayed on the one display apparatus 1003 to a part of the first image 30. In response to the signal, the controller 170 of a master display apparatus 112 may re-divide the first image into three images corresponding to the number of the plurality of display apparatuses 1001 and 1002 and display apparatus 1003. In addition, the controller 170 of the master display apparatus 112 may control each of the re-divided first image 30 to be displayed on the plurality of display apparatuses 1001 and 1002 and display apparatus 1003. Accordingly, the re-divided first image may be displayed on the plurality of display apparatuses 1001 and 1002 and display apparatus 1003.

Figure 11:
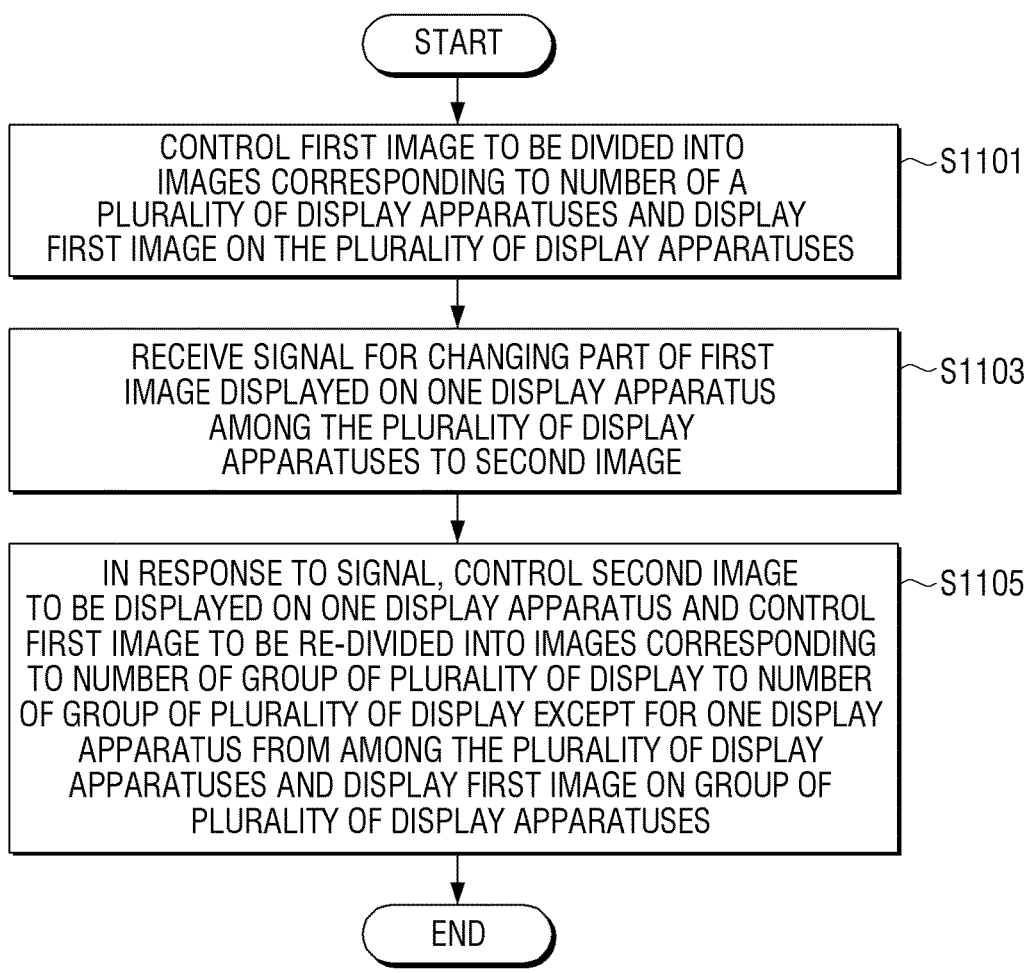
FIGS. 11 to 14 are flow charts provided to describe a method of displaying an image by using a plurality of display apparatuses according to an exemplary embodiment.

FIG. 11 is a flow chart provided to describe a method of displaying an image by using a plurality of display apparatuses according to an exemplary embodiment.

In operation S1101, the electronic apparatus 100 may control the first image to be divided into images corresponding to the number of a plurality of display apparatuses and display the first image on the plurality of display apparatuses. In this case, the electronic apparatus 100 may be one of the plurality of display apparatuses or may be an external apparatus which is located outside the plurality of display apparatuses.

In operation S1103, the electronic apparatus 100 may receive a signal for changing a part of the first image displayed on one display apparatus among the plurality of display apparatuses to the second image. For example, the electronic apparatus 100 may receive a user input signal of pressing a button of a remote controller which is located outside the plurality of display apparatuses above a predetermined time.

In operation S1105, in response to the signal in operation S1103, the electronic apparatus 100 may control the second image to be displayed on one display apparatus among the plurality of display apparatuses. In addition, the electronic apparatus 100 may control the first image to be re-divided into images corresponding to the number of a group of plurality of display apparatuses among the plurality of display apparatuses and display the first image on the group of plurality of display apparatuses. In this case, the group of plurality of display apparatuses do not include one display apparatus which displays the second image.

Figure 12:
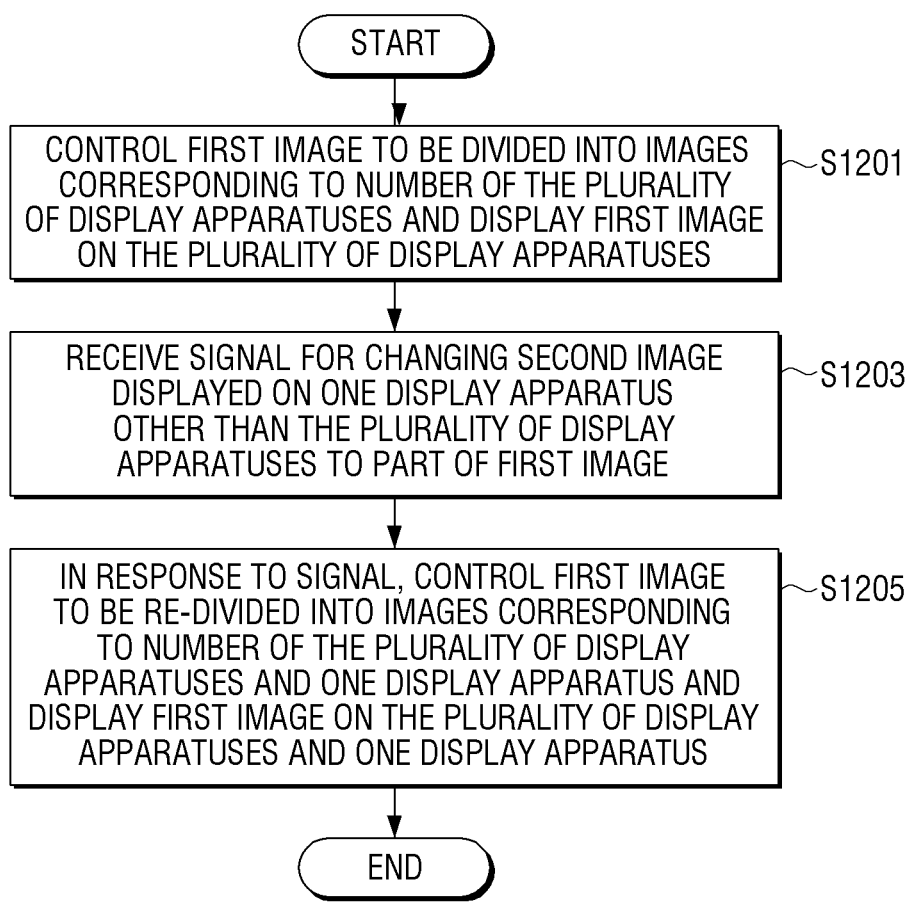

FIG. 12 is a flow chart provided to describe a method of displaying an image by using a plurality of display apparatuses according to another exemplary embodiment.

In operation S1201, the electronic apparatus 100 may control the first image to be divided into images corresponding to the number of the plurality of display apparatuses and display the first image on the plurality of display apparatuses.

In operation S1203, the electronic apparatus 100 may receive a signal for changing the second image displayed on one display apparatus other than the plurality of display apparatuses to a part of the first image. In this case, the plurality of display apparatuses and the one display apparatus may be combined with each other physically or located proximately to each other.

In operation S1205, in response to receiving the signal, the electronic apparatus 100 may control the first image to be re-divided into images corresponding to the number of the plurality of display apparatuses and the one display apparatus and display the first image on the plurality of display apparatuses and the one display apparatus. In this case, the second image displayed on the one display apparatus may be changed to a part of the first image.

Figure 13:
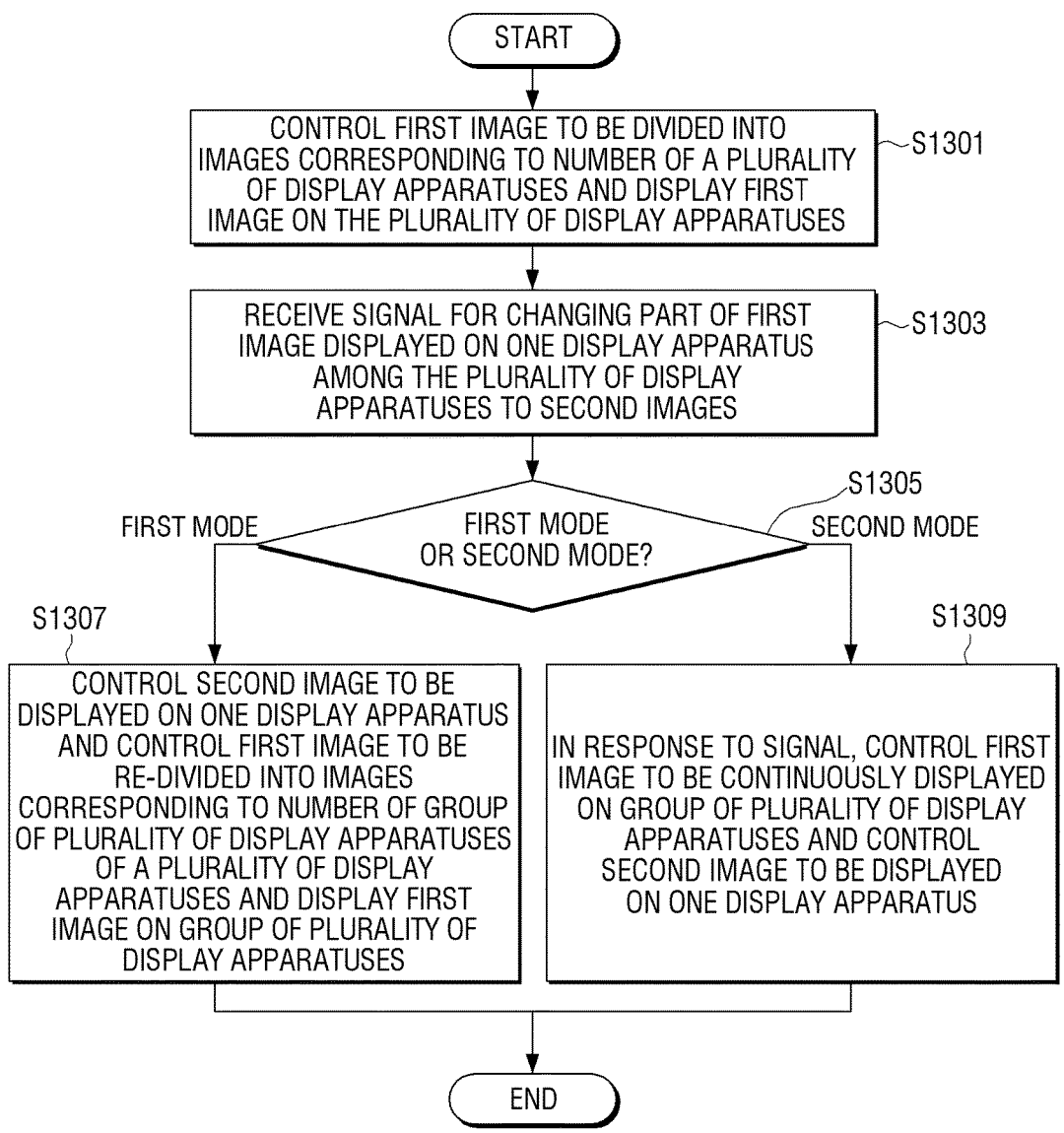

FIG. 13 is a flow chart provided to describe a method of displaying an image by using a plurality of display apparatuses according to still another exemplary embodiment.

In operation S1301, the electronic apparatus 100 may control the first image to be divided into images corresponding to the number of a plurality of display apparatuses and display the first image on the plurality of display apparatuses.

In operation S1303, the electronic apparatus 100 may receive a signal for changing a part of the first image displayed on one display apparatus among the plurality of display apparatuses to the second image.

In operation S1305, the electronic apparatus 100 may determine whether a mode where the first image and the second image are displayed on the plurality of display apparatuses is the first mode for displaying the second image as a form of the PIP of the first image or the second mode for displaying the second image as a form of the POP of the first image.

In operation of S1307, in the first mode where the second image is displayed as a form of the PIP of the first image, in response to an input signal, the electronic apparatus 100 may control the second image to be displayed on one display apparatus and control the first image to be re-divided into images corresponding to the number of a group of plurality of display apparatuses among the plurality of display apparatuses and display the first image on the group of plurality of display apparatuses.

In operation S1309, in the second mode where the second image is displayed as a form of the POP of the first image, in response to an input signal, the electronic apparatus 100 may control the first image to be continuously displayed on the group of plurality of display apparatuses and control the second image to be displayed on the one display apparatus.

Figure 14:
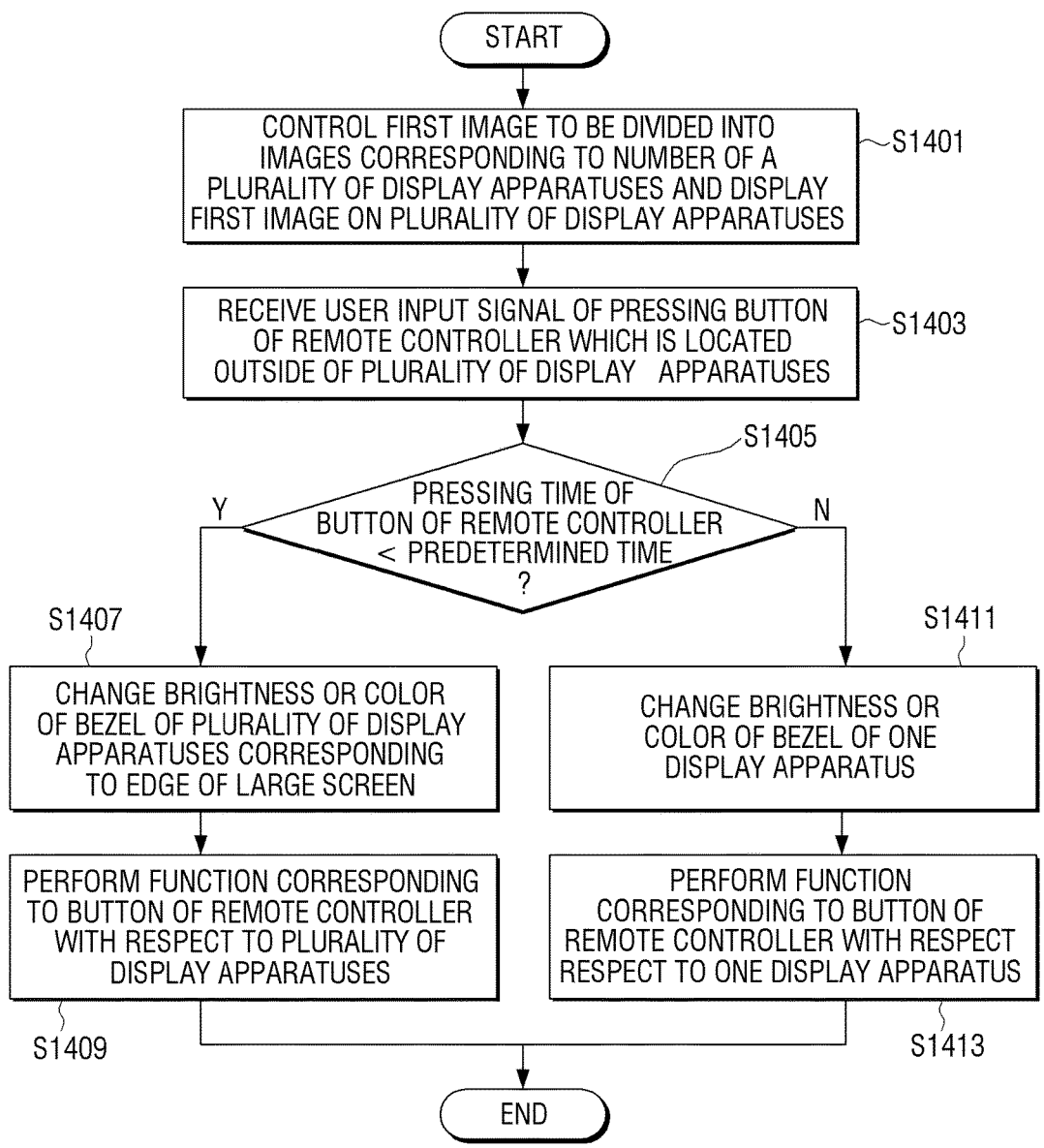

FIG. 14 is a flow chart provided to describe a method of displaying an image by using a plurality of display apparatuses according to still another exemplary embodiment.

In operation S1401, the electronic apparatus 100 may control the first image to be divided into images corresponding to the number of a plurality of display apparatuses and display the first image on the plurality of display apparatuses.

In operation S1403, the electronic apparatus 100 may receive a user input signal of pressing a button of a remote controller which is located outside of the plurality of display apparatuses.

In operation S1405, the electronic apparatus 100 may determine whether the amount of time during which a user presses the button of the remote controller is within a predetermined time or exceeds the predetermined time.

In operation S1407, in response to the pressing time of the button of the remote controller being within the predetermined time, the electronic apparatus 100 may determine that a user controls a plurality of display apparatuses and may change the brightness or color of a bezel of the plurality of display apparatuses corresponding to an edge of a large screen which is formed by combining the plurality of display apparatuses.

In operation S1409, in response to the pressing time of the button of the remote controller exceeding the predetermined time, the electronic apparatus 100 may perform a function corresponding to the button of the remote controller with respect to the plurality of display apparatuses. In this case, operation S1409 may be performed concurrently with operation S1407 or may be performed in advance of operation S1407.

In operation S1411, in response to the pressing time of the button of the remote controller exceeding the predetermined time, the electronic apparatus 100 may determine that the user controls one display apparatus and may change the brightness or color of a bezel of the one display apparatus.

In operation S1413, in response to the pressing time of the button of the remote controller exceeding the predetermined time, the electronic apparatus 100 may perform a function corresponding to the button of the remote controller with respect to the one display apparatus. In this case, operation S1413 may be performed concurrently with operation 1411 or may be performed in advance of operation S1411.

Figure 15:
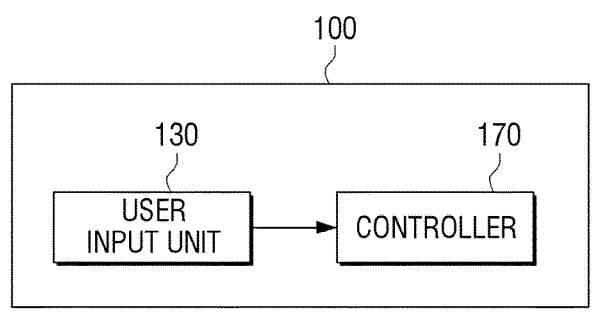
FIG. 15 is a block diagram illustrating a structure of an electronic apparatus according to another exemplary embodiment.

FIG. 15 is a block diagram illustrating a structure of the electronic apparatus 100 according to another exemplary embodiment.

According to FIG. 15, the electronic apparatus 100 includes the user input unit 130 and the controller 170. An example of the structures of the user input unit 130 and the controller 170 was described above, and thus, the overlapping description is omitted.

In response to the first image being displayed on a plurality of display apparatuses, the user input unit 130 may receive a signal for changing a part of the first image displayed on one display apparatus among the plurality of display apparatuses to the second image.

In response to the signal, the controller 170 may control the second image to be displayed on the one display apparatus, and control the first image to be re-divided into images corresponding to the number of a group of plurality of display apparatuses except for the one display apparatus among the plurality of display apparatuses and display the first image on the group of plurality of display apparatuses.

The aforementioned exemplary embodiments may be realized as hardware, software, or combination thereof. Such software may be stored in, for example, regardless of whether deletion or re-writing is possible or not, a volatile recording medium, such as a ROM or a non-volatile recording medium, or for example, a memory such as a RAM, a memory chip, a device, an integrated circuit, etc., or for example, a recording medium which is optically or magnetically recordable and readable by a machine (for example, computer), such as a Compact Disk (CD), a Digital Versatile Disk (DVD), a magnetic disk, or a magnetic tape, etc.

The method of displaying an image by using a plurality of display apparatuses of the exemplary embodiments may be embodied by a computer including a controller and a memory. In addition, the memory may be an example of a recording medium which is readable by a machine suitable for storing a program or programs including instructions for embodying the exemplary embodiments. Accordingly, the exemplary embodiments includes a program including a code for embodying an apparatus or a method recited in any claim of the specification and a recording medium which is readable by a machine (for example, computer) where such program is stored. In addition, the program may be electrically transmitted through a medium such as a communication signal which is transmitted through wired or wireless connection, and the present disclosure includes equivalents thereto appropriately. At least one of the plurality of display apparatuses in the exemplary embodiments may receive and store the program from a program providing apparatus which is connected in a wired or wireless manner. Further, a user is able to selectively use limiting operations according the exemplary embodiments to at least one of the plurality of display apparatuses or extending the operations through operation with a server by using a network.

According to various exemplary embodiments, a user is able to select a TV which the user wants to control easily from among a plurality of TVs, by moving a remote controller.

In addition, the user is able to select a large screen or a respective screen easily by using the remote controller.

In addition, in response to an image being displayed through a plurality of TVs, the user is able to selectively display an image of at least one TV among a plurality of TVs, as a form of a PIP or a POP.

The user is also able to intuitively determine whether a controlled object is a large screen or a respective screen through variations of a bezel.

Although a few exemplary embodiments have been shown and described, the inventive concept is not limited to the aforementioned exemplary embodiments, and could be variously modified and achieved by those skilled in the art to which the inventive concept pertains without deviating from the substance of the exemplary embodiments which is claimed in the claims, and such modifications should not be understood separately from the technical concept or prospect of the inventive concept.

What is claimed is:

1. A method performed by an electronic apparatus for displaying an image by using a plurality of display apparatuses, the method comprising:

controlling a first image to be divided into a first set of sub-images which corresponds to a number of the plurality of display apparatuses and displaying the first set of sub-images on the plurality of display apparatuses;

based on receiving a signal to select at least one display apparatus from among the plurality of display apparatuses and to change at least one sub-image corresponding to the at least one display apparatus to a second image from a remote controller, identifying whether a display mode is set to a first mode or a second mode;

based on the display mode being set to the first mode, changing the at least one sub-image corresponding to the at least one display apparatus to the second image without changing other sub-images of the first set of sub-images;

based on the display mode being set to the second mode, changing the at least one sub-image corresponding to the at least one display apparatus to the second image, controlling the first image to be re-divided into a second set of sub-images of which a number corresponds to a number of a subset of the plurality of display apparatuses, the subset of the plurality of display apparatuses not including the at least one display apparatus, and displaying the second set of sub-images on the subset of the plurality of display apparatuses such that the second image does not overlap the second set of sub-images; and based on the display mode being set to the second mode and there being at least one display which does not display either the first image or the second image from among the subset of the plurality of display apparatuses, changing the display mode from the second mode to the first mode.

2. The method as claimed in claim 1, further comprising:

in response to the first image being displayed on the plurality of display apparatuses which forms a large screen, changing a brightness or a color of a bezel of the plurality of display apparatuses which corresponds to an edge of the large screen, and in response to the second image being displayed on the at least one display apparatus, changing the brightness or the color of a bezel of the at least one display apparatus.

3. The method as claimed in claim 1, wherein the signal is generated when a predetermined button on the remote controller is pressed at least for a predetermined time, and
wherein a signal to select the plurality of display apparatuses and change the first image displayed on the plurality of display apparatuses to the second image is generated when the predetermined button is pressed less than the predetermined time.

4. The method as claimed in claim 1, further comprising:
identifying the at least one display apparatus from among the plurality of display apparatuses,
wherein the identifying the at least one display apparatus comprises identifying the at least one display apparatus based on information which represents that the remote controller, which is external to the plurality of display apparatuses, tilts or moves in a direction of the at least one display apparatus.

5. The method as claimed in claim 1, further comprising:
controlling one of an application, a channel information, and advertisement information to be displayed on at least one display apparatus of the plurality of display apparatuses other than the subset of the plurality of display apparatuses.

6. The method as claimed in claim 1, further comprising identifying the at least one display apparatus and the subset of the plurality of display apparatuses by considering at least one of the number of the plurality of display apparatuses and an arrangement of the plurality of display apparatuses.

7. The method as claimed in claim 1, wherein the subset of the plurality of display apparatuses and the at least one display apparatus are physically combined or located proximately to each other.

8. The method according to claim 1, wherein one of the plurality of display apparatuses is selected as a master display apparatus, and the master display apparatus is used to control the first image on the plurality of display apparatuses.

9. An electronic apparatus which displays an image by using a plurality of display apparatuses, the electronic apparatus comprising a processor to implement:
an input unit configured to, while a first image is divided into a first set of sub-images and displayed on the plurality of display apparatuses, receive a signal to select at least one display apparatus from among the plurality of display apparatuses and change at least one sub-image of the first set of sub-images displayed on the at least one display apparatus to a second image from a remote controller; and
a controller configured to:
based on the signal being received, identify whether a display mode is set to a first mode or a second mode,
based on the display mode being set to the first mode, change the at least one sub-image of the first set of sub-images displayed on the at least one display apparatus to the second image without changing other sub-images of the first set of sub-images,
based on the display mode being set to the second mode, change the at least one sub-image to the second image, control the first image to be re-divided into a second set of sub-images of which a number corresponds to a number of a subset of the plurality of display apparatuses, the subset of the plurality of display apparatuses not including the at least one display apparatus, and display the second set of sub-images on the subset of the plurality of display apparatuses such that the second image does not overlap the second set of sub-images, and
based on the display mode being set to the second mode and there being at least one display which does not display either the first image or the second image from among the subset of the plurality of display apparatuses, change the display mode from the second mode to the first mode.

10. The electronic apparatus as claimed in claim 9, wherein the signal is generated when a predetermined button on the remote controller is pressed at least for a predetermined time, and
wherein a signal to select the plurality of display apparatuses and change the first image displayed on the plurality of display apparatuses to the second image is generated when the predetermined button is pressed less than the predetermined time.

11. The electronic apparatus as claimed in claim 9, wherein the controller is configured to, in response to the first image being displayed on the plurality of display apparatuses which form a large screen, change a brightness or a color of a bezel of the plurality of display apparatuses which corresponds to an edge of the large screen, and in response to the second image being displayed on the at least one display apparatus, change the brightness or the color of a bezel of the at least one display apparatus.

12. The electronic apparatus as claimed in claim 9, wherein the controller is configured to identify the at least one display apparatus based on information which represents that the remote controller, which is external to the plurality of display apparatuses, tilts or moves in a direction of the at least one display apparatus.

13. The electronic apparatus as claimed in claim 9, wherein the controller is configured to control one of an application, a channel information, and an advertisement information to be displayed on at least one display apparatus other than the subset of the plurality of display apparatuses.

14. The electronic apparatus as claimed in claim 9, wherein the controller is configured to identify the at least one display apparatus and the subset of the plurality of display apparatuses by considering at least one of the number of the plurality of display apparatuses and an arrangement of the plurality of display apparatuses.

* * * * *